United States Patent [19]
McIntosh

[11] Patent Number: 4,934,694
[45] Date of Patent: Jun. 19, 1990

[54] COMPUTER CONTROLLED EXERCISE SYSTEM

[76] Inventor: James L. McIntosh, 4430 W. 109th Pl., Westminister, Colo. 80030

[21] Appl. No.: 166,031

[22] Filed: Mar. 9, 1988

Related U.S. Application Data

[63] Continuation of Ser. No. 805,719, Dec. 6, 1985, abandoned.

[51] Int. Cl.$^5$ .......................................... A63B 21/005
[52] U.S. Cl. .................................. 272/129; 272/125; 272/DIG. 6; 128/25 R
[58] Field of Search .................... 272/129, 73, 96, 130, 272/DIG. 5, DIG. 6, 125; 128/25 R

[56] References Cited

U.S. PATENT DOCUMENTS 4,060,239 11/1977 Pfleiderer et al. .................... 272/73
4,628,910 12/1986 Krukowski .......................... 272/129

Primary Examiner—Richard J. Apley
Assistant Examiner—Joe H. Cheng
Attorney, Agent, or Firm—Sheridan, Ross & McIntosh

[57] ABSTRACT

A DC motor is connected to a driveshaft the rotation of which is directly coupled to movement of an exercise member. The DC motor is operated in the current control mode wherein current direction and value through the winding of the motor determines its torque. An encoder is connected to the shaft of the motor to monitor its angular position. A program controlled processor monitors the angular position of the shaft and controls the current to the motor to vary the torque thereof and, thus, the force of resistance or assistance to the exercise member in accordance with preprogrammed values and as a function of angular position. A plurality of encoder/motor assemblies control exercise about a plurality of axes of bodily movement.

27 Claims, 16 Drawing Sheets

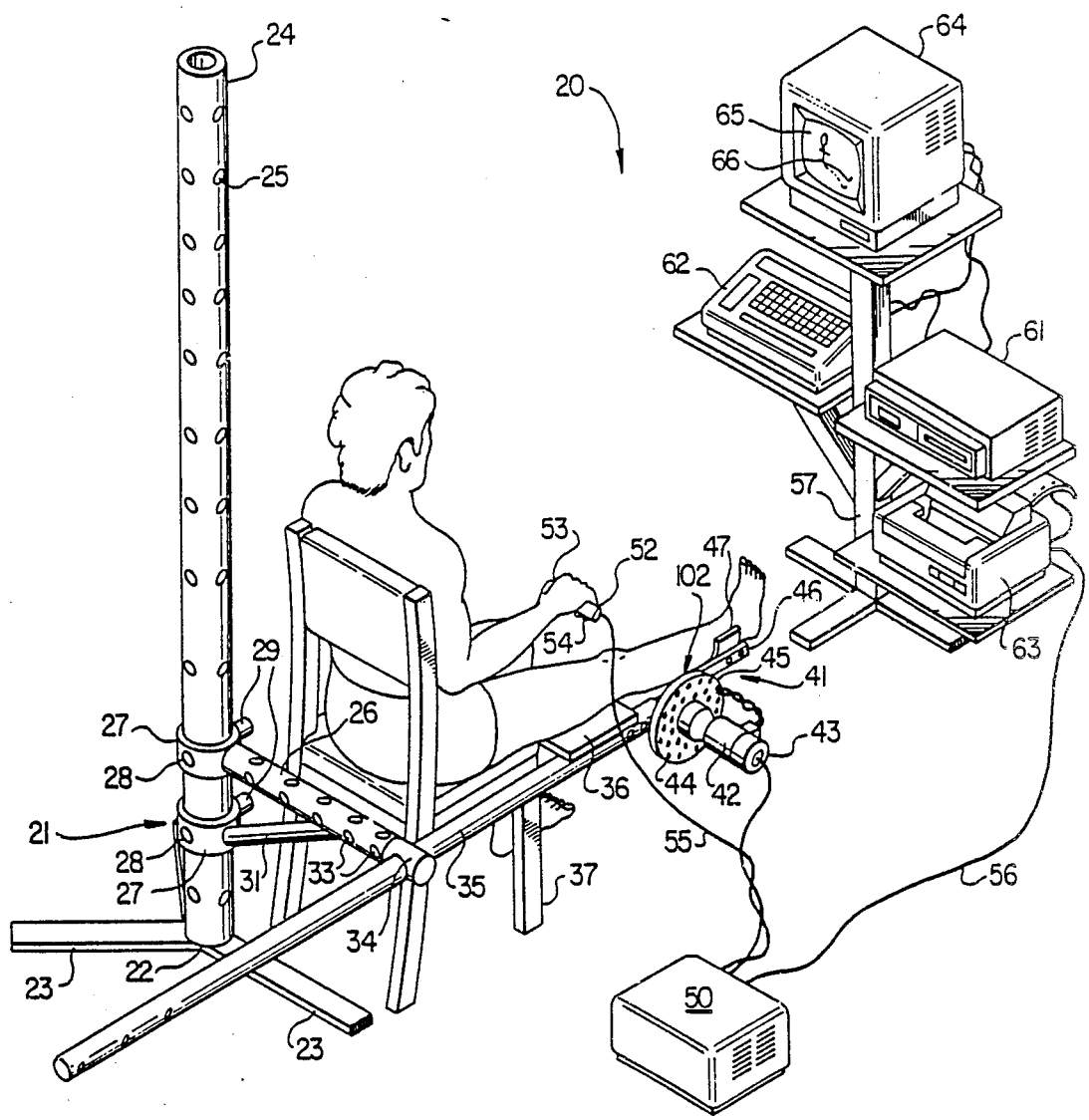
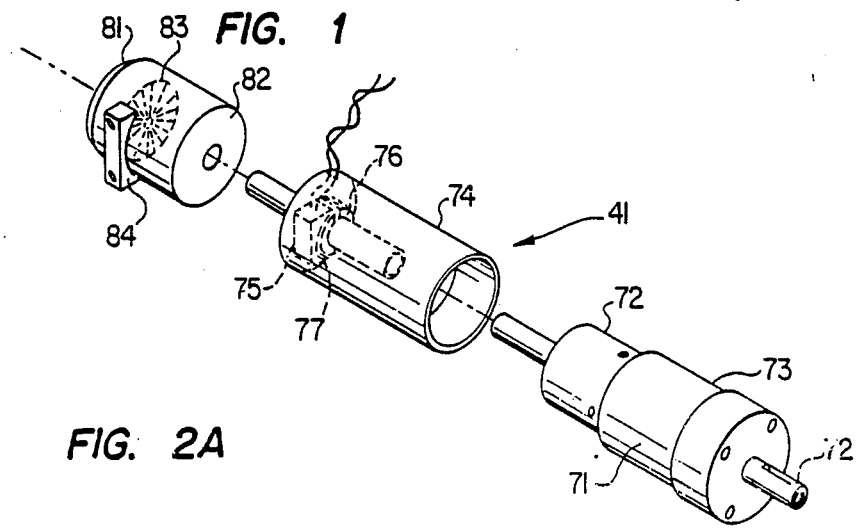
FIG. 1
FIG. 2A

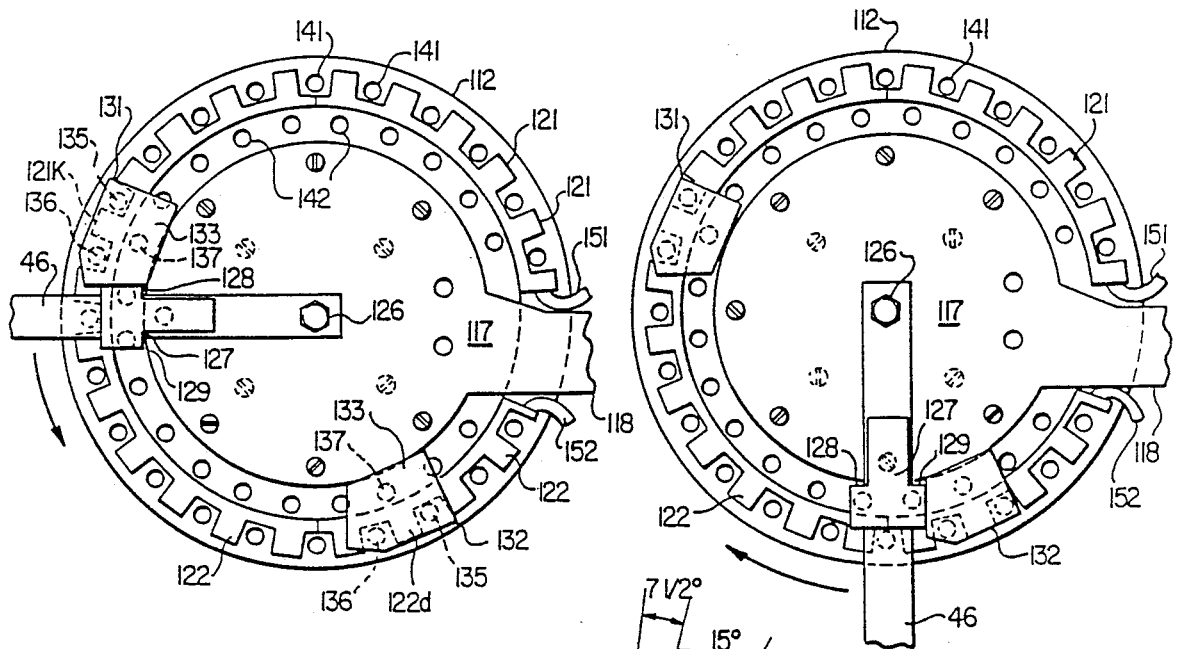
FIG. 3D
FIG. 3E
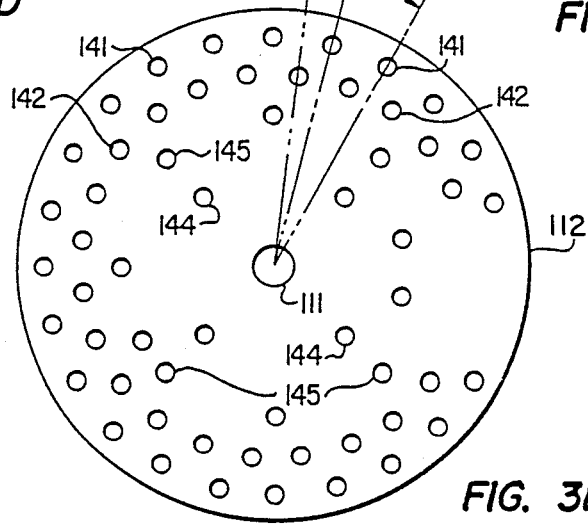
FIG. 3B
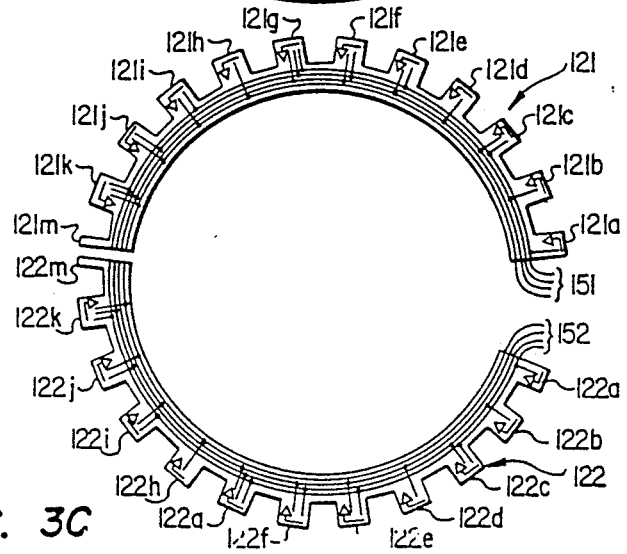
FIG. 3C

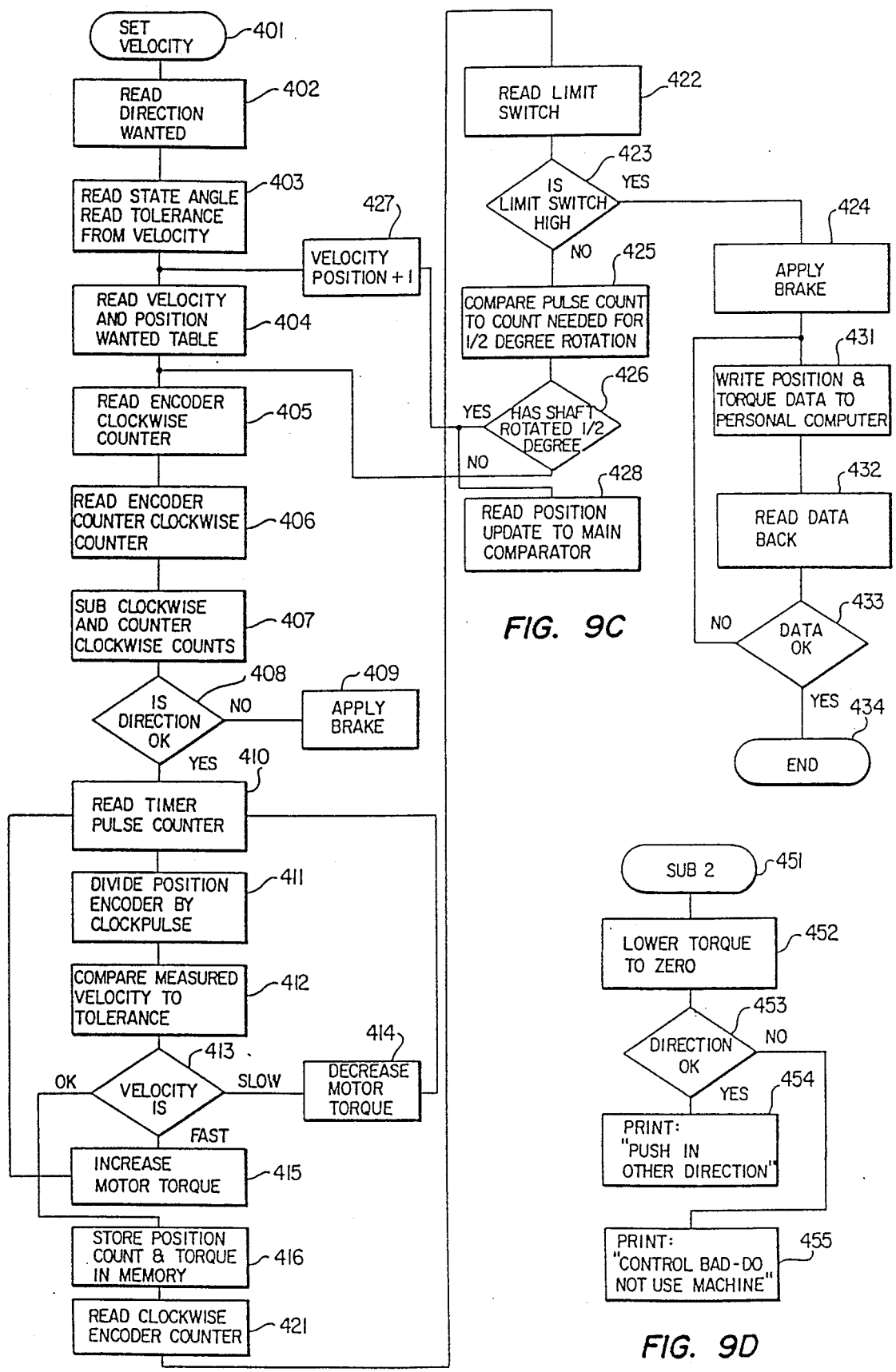

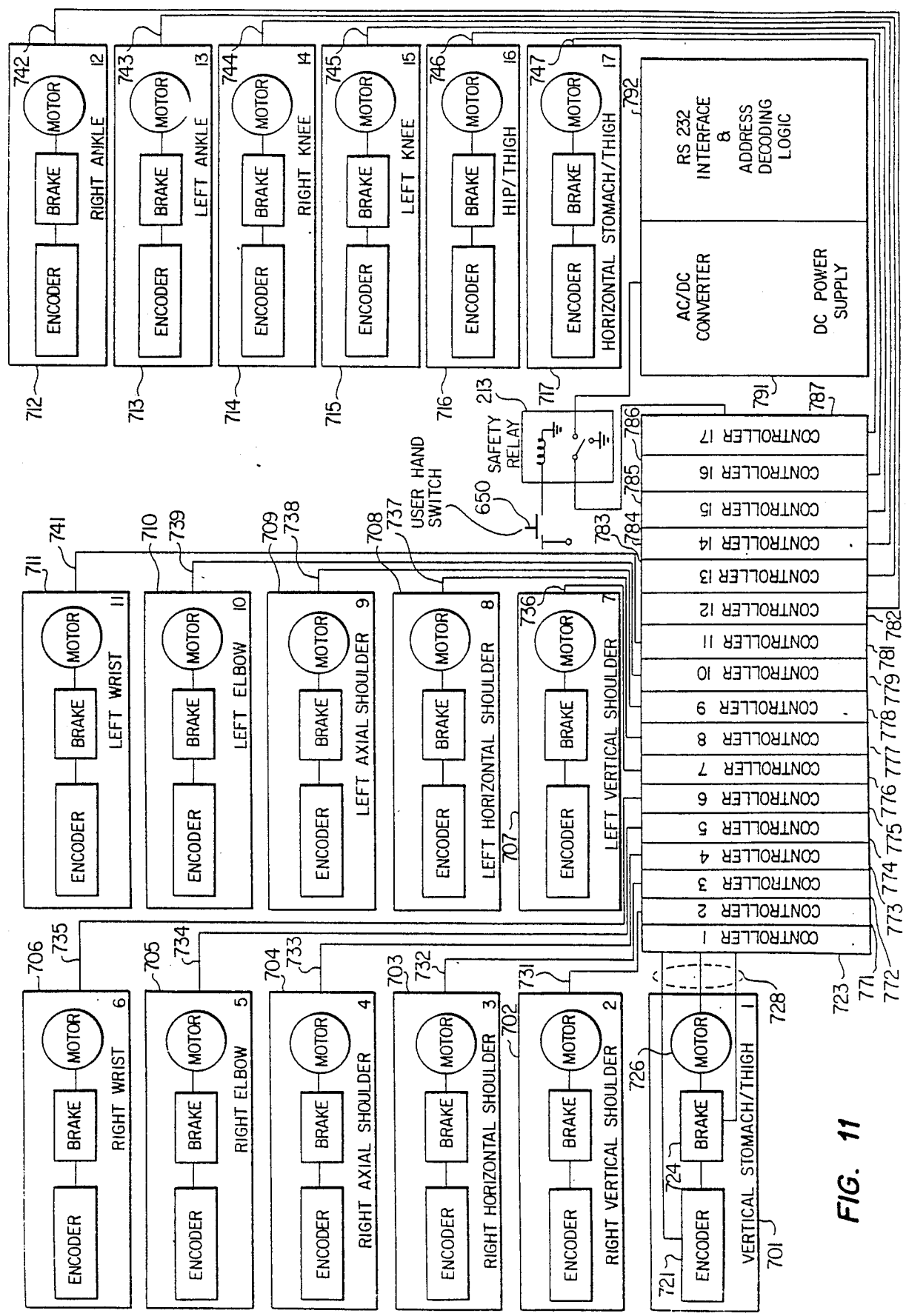

COMPUTER CONTROLLED EXERCISE SYSTEM

This is a continuation of application Ser. No. 805,719 filed Dec. 6, 1985, now abandoned.

BACKGROUND OF THE INVENTION

1. Field of the Invention

The invention relates to computer controlled exercise machines, and in particular, to a system for optimizing the exercise of skeletal muscles under program control.

2. History of the Prior Art

Throughout history, men have sought to improve the athletic and job oriented performance of their bodies by engaging in physical exercise to improve the size, strength, and tone of the skeletal muscles. One of the earliest ways in which such exercise was practiced, and which persists today, is the use of free weights to provide a resistance to either compression or extension of a muscle group and thereby produce growth in the size of the muscle group in response to the repeated stress placed thereon.

One difficulty with free weight exercise is that an initial amount of force is necessary to overcome the inertia of first movement of the weight and thereafter less force is required to continue movement of the weight. Thus, selecting a free weight of a size sufficient to create a desired resistance against the muscles results in most of the muscular movement being against a force substantially less than the force required to overcome the initial inertial resistance to movement of the free weight.

Another well known principal of exercise physiology is that as a skeletal muscle is exercised, it is capable of exerting varying amounts of force over its range of movement. For example, in a simple biceps exercise when a weight is lifted by bending the elbow to bring the hand holding the weight near to the shoulder (a biceps curl) the amount of force which the muscle is capable of exerting against the resistance of the weight varies over the range of movement from a position where the arm is straight to a position where the arm is near the shoulder. Further, the particular pattern of variation of muscular force varies from individual to individual. This makes it even more difficult to maintain an optimum force of resistance to muscular movement over its full range of movement.

A dramatic improvement in exercise technology was effected by the advent of "iso-kinetic" exercise machines wherein the amount of force against which the muscle is required to act is varied over a range of movement of the muscle. Such devices frequently employ eccentric cam mechanisms which cause the resistance of the machine to movement by the user to vary in accordance with the angular position of the eccentric cam mechanism. In this manner, a muscle group being exercised is opposed by a lower force of resistance in the region of its movement where less force is available from the muscle and by a greater force of resistance in regions of movement where the muscle has greater strength. These mechanisms greatly improve the rate at which muscular development may be effected. Such devices, however, include an inherent limitation in that the pattern of muscular strength variation over range of movement varies from individual to individual and a standard eccentric cam pattern can not optimize the resistance variations necessary for different individuals. In addition, when the exercise mechanisms are used in a rehabilitation or therapeutic environment, the muscular strength pattern of an individual may vary even more dramatically from that of a standard pattern and in some regions of movement virtually no strength exists at all and it would be desirable to provide positive assistance to the movement of the muscle rather than even the lowest degree of resistance. Iso-kinetic machines are totally incapable of applying such positive movement assisting forces.

Further improvement in the technology of exercise occurred with the advent of systems which monitor the amount of force which is exerted by a user and employ a feedback loop to provide a proportional amount of resisting force to custom configure the resistant force to the individual and to the actual muscular strength available at each point over a given range of movement. Such systems have conventionally employed either hydraulic or pneumatic means to oppose the force applied by the muscle and a transducer to measure the quantity of force being applied and generate an analog signal. The analog signal is converted to a digital signal and then compared to the value of the desired force stored in memory. If an error exist then the comparison device generates a control signal which commands a servo-motor to change the force controlling device until no error signal exists. Major problems with such systems are that their response time is very slow since the servo-motor must physically move in a very precise manner and that the electromechanical interface must include very tight mechanical tolerances in order to achieve the required accuracy. The difficulty of achieving these tolerances results in instability and oscillation. Such systems are shown in U.S. Pat. Nos. 4,235,437 to Ruis et al; U.S. Pat. No. 4,227,689 to Keiser; and U.S. Pat. No. 4,354,676 to Ariel.

A disadvantage inherent in the very nature of feedback loop controlled exercise systems is that it is extremely difficult to provide a transitional interface between the hydraulic or pneumatic force applying mechanisms and the electrical transducer mechanisms forming a critical part of the feedback loop. As a result, such systems are extremely unstable, prone to oscillation, and do not reliably perform the function intended. Other systems, such as that shown in U.S. Pat. No. 3,869,121 to Flavell have proposed to utilize a servo-system to control the electrodynamic braking force generated by an electric motor for providing a varying force of resistance as a bar is lifted and which is then used as a motor to provide a varying force of resistance as the bar is lowered. Feedback control is used to maintain a constant velocity by varying the force of resistance. Such systems are incapable of programming a velocity variation between the upper and lower limits of movement and, further, incorporate all of the instability problems inherent in classical servo-loop controlled systems.

Certain other relatively elaborate feedback controlled exercise systems have been disclosed in the prior art in which an electronic controlled device varies the forces in accordance with the prestored program and in some cases may alter the force characteristics in relation to the performance achieved by the individual performing the exercise. Additionally, some devices may even use a microprocessor to record the performance, alter the forces in a preprogrammed manner and provide a display indicating the progress of the individual both over a period of time and on an instant basis as the exercise is being performed.

The exercise system of the present invention does not include a transducer/feedback loop but rather employs a current controlled DC motor to vary the force of resistance to muscular movement. Current mode switching technology is employed to very accurately control the motor torque using only electrical signals which thereby increases the response time of the system by several orders of magnitude over the prior art electrically and mechanically interfaced feedback systems.

A permanent magnet DC motor operated in the current control mode is used to vary the force of resistance throughout the range of movement under direct programmed control by a computer. The very precise control over the variable resistance against muscular movement available with this technique enables the provision of resisting forces custom-taylored to individual requirements.

The present system allows not only an increase in the rate of improvement in muscle strength and joint flexibility but also the teaching of the user to achieve preselected optimum patterns of movement routines including speed, force, and rates of variation therein. With variable resistance exercise systems, whether of the prior art variable cam or feedback loop variety or that of the present invention, the technique of movement used is as important to the training effort as the exercise forces. The natural inclination is to lift and move as much weight as possible, with technique being secondary. Very strong training discipline is needed to overcome this natural human tendency. With the system of the present invention, proper exercise technique is insured by the computer, so that training goals and rates of improvement in performance are greatly accelerated.

The monitoring and control techniques of the system of the present invention allow multi-axis monitoring of complex joint movement to be provided so that it is unnecessary to restrain movement except about only one axis in order to effect measurement or therapy. Variable resistance exercise may be programmed in all three dimensions, the way certain limbs move naturally. In addition, specialized multi-axis training programs are also possible. For example, a golfer who wishes to improve his swing can select a program which forces him to use the proper muscles in the correct sequence and also provides a totally objective measurement of his performance. Application of the present system to any sport or other physical activity is possible by modification of the software controls.

In the therapeutic and rehabilitative fields of exercise physiology, the system of the present invention allows accurate measurement of very limited strength and the precise location of joint movement anomalies. The assistive and resistive abilities of the present system gives rehabilitative technologists exact information about the state of muscle deterioration and/or regeneration to a degree not heretofore available.

SUMMARY OF THE INVENTION

The system of the present invention includes a program controlled force exercise apparatus having a driveshaft with an exercise arm extending radially therefrom and adapted for engagement by a user to perform muscular exercise by moving the arm arcuately about the driveshaft. A direct current electric motor has a rotor connected to the drive shaft and the motor is operable in the current mode to control its torque by varying the current through the windings. The exercise arm mounts a means for providing a continuous output signal indicative of the arcuate position of the arm. A program controlled processor means is responsive to the continuous output signal and to the current through the windings of the motor for varying the current to provide a preprogrammed variation in the torque exerted by the motor and, thus, the force exerted by the exercise arm against the user.

In a further aspect the invention includes a means mounted to the motor for providing first and second angular position limit signals indicative, respectively, of selected clockwise and counterclockwise limits of permissible arcuate movement of the exercise arm. In addition, the processor means is responsive to the angular position limit signals in its preprogrammed variation in motor current.

A still further aspect of the invention includes means mounted to the exercise arm for providing a limit reached signal to the processor means in a response to the exercise arm reaching the limit of its permissible arcuate movement.

In a still further aspect the invention includes an improved variable force exercise system of the type which includes an exercise member adapted for engagement with and movement by a user to effect exercise of the user's muscles, a means for converting movement of the exercise member by the user into rotation of a driveshaft, and a DC motor in which the torque thereof is controlled by the current through the windings connected to the driveshaft for rotation therewith. The improvement of the invention includes a current mode power supply connected to the windings of the DC motor, with the power supply having means for controlling the positive and negative current produced thereby to change the direction and value of the current flow through the motor windings and vary the torque thereof and thereby change the force of resistance or assistance provided by the exercise member to movement by the user.

In another embodiment the invention includes a program controlled processor responsive to the angular position of the driveshaft and to a stored program for controlling the current produced by the current mode power supply.

BRIEF DESCRIPTION OF DRAWINGS

For a more complete understanding of the present invention and for further objects and advantages thereof, reference may be had to the following detail description taken in conjunction with accompanying drawing in which:

FIG. 1 is a perspective view of a single axis embodiment of the exercise system constructed in accordance with the teachings of the present invention;

FIG. 2A is an exploded perspective view of a current mode controlled motor assembly included as part of the system of the present invention;

FIG. 3B is a top plan view of a perforated plate forming part of the angular position indicating and movement limitating system of the motor assembly of FIG. 2A;

FIG. 3C is a top plan view of the angular position indicating switch assembly used in the motor assembly of FIG. 2A;

FIGS. 3D and 3E are top plan views of the angular position indicating and movement limiting system of FIG. 3A shown, respectively, at two different positions;

FIGS. 9A through 9H are flow diagrams illustrating the method of operation and programming which control the single axis embodiment of system of the present invention shown in FIG. 1;

FIG. 11 is a block diagram of a multi-axis exercise system constructed in accordance with the present invention illustrated in FIG. 10;

DETAILED DESCRIPTION OF THE PREFERRED EMBODIMENT

Figure 2B:
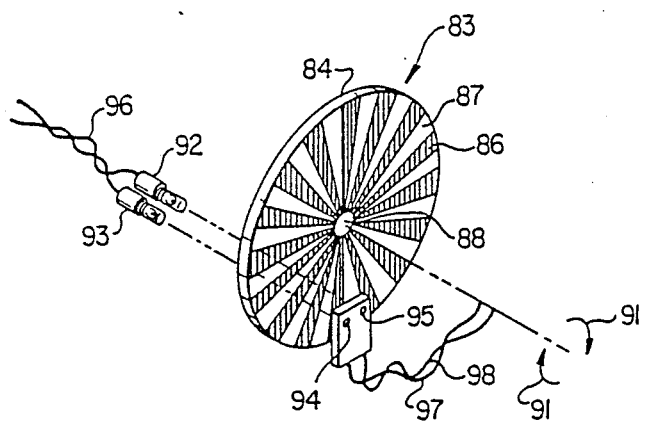
FIG. 2B is an optical position encoder for the motor assembly shown in FIG. 2A.

The fundamental operating principle of the exercise system of the present invention is based upon the physics equation that provides that the torque of a DC electric motor is equal to a constant, which is determined by the motor construction, times the current through the motor, i.e., $T=K(I)$. This relationship means that by controlling the current through the electric motor the output torque of the motor can be determined. Utilization of this principle totally eliminates the needs for servo-feedback loops which measure torque actually being produced by a motor and then utilize that measurement to adjust the current. In the present system, the effect of changing the current through the DC motor at the heart of the system is identical to the changing of weights at the end of an arm in order to change the torque. The angular position of the shaft of a DC motor is used as the force controlling element in the present system and current mode control of that motor allows a computer to rapidly change the motor torque. A position indicator such as an optical encoder is used to determine both the angular position and the angular velocity of the shaft to enable the machine to be programmed in three distinct modes of operation, wherein: (1) the computer sets the torque according to the angular position of the shaft and thereafter measures and records angular velocity of the shaft; (2) the computer sets the angular velocity of the shaft and varies and records the torque required to maintain that velocity; and (3) the computer sets initial values of both velocity torque so that when the velocity goes above or below the boundaries of a selected range, the computer adjusts the torque values on the next successive repetitions to maintain the velocity (similar to the first mode of operation only with much coarser corrections).

The desired position or velocity of the joint being exercised, and hence, controlling the movement of the DC current control motor, is displayed by the computer in stick figure form by means of a color monitor. The achieved performance of the user may be displayed in one color while the levels of force required to achieve desired performance levels are presented in different colors on the stick figure. If the performance falls outside certain selected parameters, the achieved figure may be arranged to blink, indicating which axis is failing to achieve the desired performance and providing easily interpreted visual feedback to the user. When an exercise routine has been completed, the achieved and desired performances may be printed out in both numerical and pictorial form for each axis which has been exercised. In addition, the system can be easily changed by the user in high level language to any torque/velocity/position routine which is desired in individual circumstances.

In one embodiment the system of the present invention includes control over most major axes of joint rotation including ankle, knee, hip (2 dimensions), shoulder (3 dimensions), and elbow. In other embodiments only a single axis of rotation is monitored and controlled.

Single Axis System Arrangement

Referring first to FIG. 1, a single axis embodiment 20 of the system of the present invention is shown which includes a stand 21 comprising a floor supported base 22 having a plurality of radially extending feet 23 to which are mounted a vertically extending shaft 24. The shaft 24 includes a plurality of longitudinally spaced mounting apertures 25 which are orthogonally arranged from one another around the circumference of the shaft 24. The apertures 25 allow various arms to be supported by the shaft 24 at different orientations and at different positions along the length thereof.

A transverse support arm 26 is mounted to the shaft 24 by a circular sleeve 27 having circumferential apertures 28 which receive securement pins 29. By longitudinal and rotational movement of the sleeve 27 along the shaft 24, placement of a pin 29 through an aligned aperture 28 in the sleeve 27 and an aperture 25 in the shaft 24 allows universal positioning of the arm 26.

The arm 26 also includes a lower support brace 31 which is also affixed to a circular sleeve 27 having mounting apertures 28 and a securement pin 29 for enabling the arm 26 to support a vertical load. The arm 26 also includes a plurality of longitudinally spaced and circumferentially disposed apertures 33 along with an enlarged support opening 34 extending transversely through the end thereof. The support opening 34 receives a motor assembly mounting shaft 35 which is movable longitudinally in the opening 34 to a selected position. An encoder and motor assembly 41 is mounted at the end of the shaft 35. A transversely extending thigh support plate 36 is attached to the shaft 35 to support the under surface of the thigh of a user seated in a chair 37 and employing the motor assembly 41 to exercise the knee joint.

The motor assembly 41 includes a DC motor 42 having an angular position encoder 43 affixed to one end of the rotor shaft of the motor and a gearbox 44 having an output driveshaft affixed to the other end of the motor shaft. A position indicating plate 45 is affixed to the motor housing with the gearbox output driveshaft 102 extending therethrough and being mounted to a radially extending exercise arm 46. The shaft of the motor 42 extends perpendicular to the plane of the exercise movement about the joint to be exercised. It should be understood that the output driveshaft 102 of the gearbox 44 is the torque controlled rotating member of the present system. The driveshaft may be coupled to an exercise member through a rope and pulley, a gear and chain or by other functionally equivalent means such as the illustrative radially extending and arcuately moving exercise arm 46 shown in FIG. 1.

The radially extending exercise arm 46 includes a bracket 47 for receiving the body portion of the user, in the instance shown the calf and ankle of a knee joint 48 being exercised. The motor assembly 41 is connected to the cabinet containing the control system 50 by means of a cable 51. In addition, the user holds a hand unit 52 containing a thumb switch 53 and finger actuated switch 54 connected to the control cabinet 50 by a cable 55. The motor assembly 41 includes an electromechanical brake which is mounted directly on the motor shaft and powered by an independent power supply. In addition, all operating power for the system is supplied through an electromechanical relay which is normally shorted to ground for the motor driver circuit and normally on for the brake. To energize the system and release the brake, the finger actuated switch 54 of the hand unit 52 must be held continuously closed by the user. If for any reason the user desires to stop the machine, releasing of the hand switch 54 turns on the motor shaft brake, removes all current to the motor, and shorts the motor power supply to ground providing a virtually fail safe protection from any system malfunctions In another safety feature, the position indicating plate 45 includes mechanical stops which physically limit the range of movement of the radially extending exercise arm 46 to a fixed arc and make it impossible to move a joint being exercised through a greater arc than is selected by the user.

The control cabinet 50 is connected to peripheral control and monitoring equipment by means of a cable 56. A stand 57 supports a small personal computer 61 which is interconnected with a keyboard 62, a printer 63 and a CRT monitor 64. The computer 61 may be of any one of the small home type computers which are readily available. In particular, any of the types of home computers which employ IBM compatable software and peripheral interfaces are particularly adaptable to use with the present system. The keyboard 62 is used to address the computer 61 for either major alterations in the software stored therein, for selecting and/or customizing preprogrammed routines, or for calling from memory previously stored routines, performance history, and other of the miriad of preprogrammed and stored data. The user can also answer inquiries from the computer or instruct it by means of the thumb switch 53. The monitor 64 is preferably a color CRT monitor and capable of displaying on its screen 65 stick figure representations 66 of both intended exercise movements, exercise movements as they are being performed, and past performance of exercise movement in a plurality of different colors as may be selected by the programming used in control of the system.

Angular Position Encoder

Referring next to FIG. 2A, there is shown an exploded perspective view of the encoder and motor assembly 41 used in conjunction with the present invention. The assembly includes a permanent magnet DC motor 71 having a rotor shaft 72 extending axially through a cylindrical housing 73 within which permanent magnet field assemblies are located. The motor housing 73 is mounted within a cylindrical shell 74 which mounts an electromechanical brake 75 which includes opposed brake shoe members 76 and 77. The shoes are moved radially inwardly toward one another to tightly grip the motor shaft 72 and prevent its rotation in the event an electromechanical relay mounted within the brake 75 receives an actuation signal over the control leads 78.

The motor assembly 41 also includes a shaft angular position encoder subassembly 81 including a housing 82 which axially receives the motor shaft 72 the end of which is affixed to an angular position encoder disc 83. The angular position encoder 81 includes a mounting flange 84 by means of which is attached the gear box 44 and other components of the system. One embodiment of the shaft angular position encoder 83 is shown in FIG. 2B.

In FIG. 2B there is shown a transparent circular disc 84 having a plurality of radially outwardly extending angularly divided opaque areas 86. Each opaque area 86 is separated by a transparent area 87 and the center of the disc 88 is mounted to the end of the shaft 72 of the motor 71. The motor shaft and disc 84 can rotate in either clockwise or counterclockwise directions as noted by arrows 91. A pair of light sources 92 and 93 are positioned on one side of the disc 84 while a pair of photocells 94 and 95 are mounted in aligned positions on the opposite side of the disc 84. The light sources 92 and 93 are energized via wires 96 so that light passes through the transparent areas 87 and is blocked by the opaque areas 86. As the disc 84 is rotated, pulses are generated by the light sensors 94 and 95 over the leads 97 and 98 leading to the control system. These pulses are stored in electronic counters in the control system which allows a computer to tell how far and how fast the shaft rotating the disc 84 has moved. One of the light sensors 94 is slightly ahead of the other light sensor 95 so that rotation of the disc in one direction produces a different pulse pattern than rotation of the shaft in the other direction. The lines on the optical encoder disc 84 are preferably formed at 0.1 degrees of arc from one another to provide a very high degree of resolution of the position of the shaft of the motor. In other embodiments, the angular position encoder for the shaft may also include angular positions sensing means such as Hall effect devices which sense the movement of a magnetized area and provide similar angular position encoding for the motor shaft.

Angular Movement Limit System

Figure 3A:
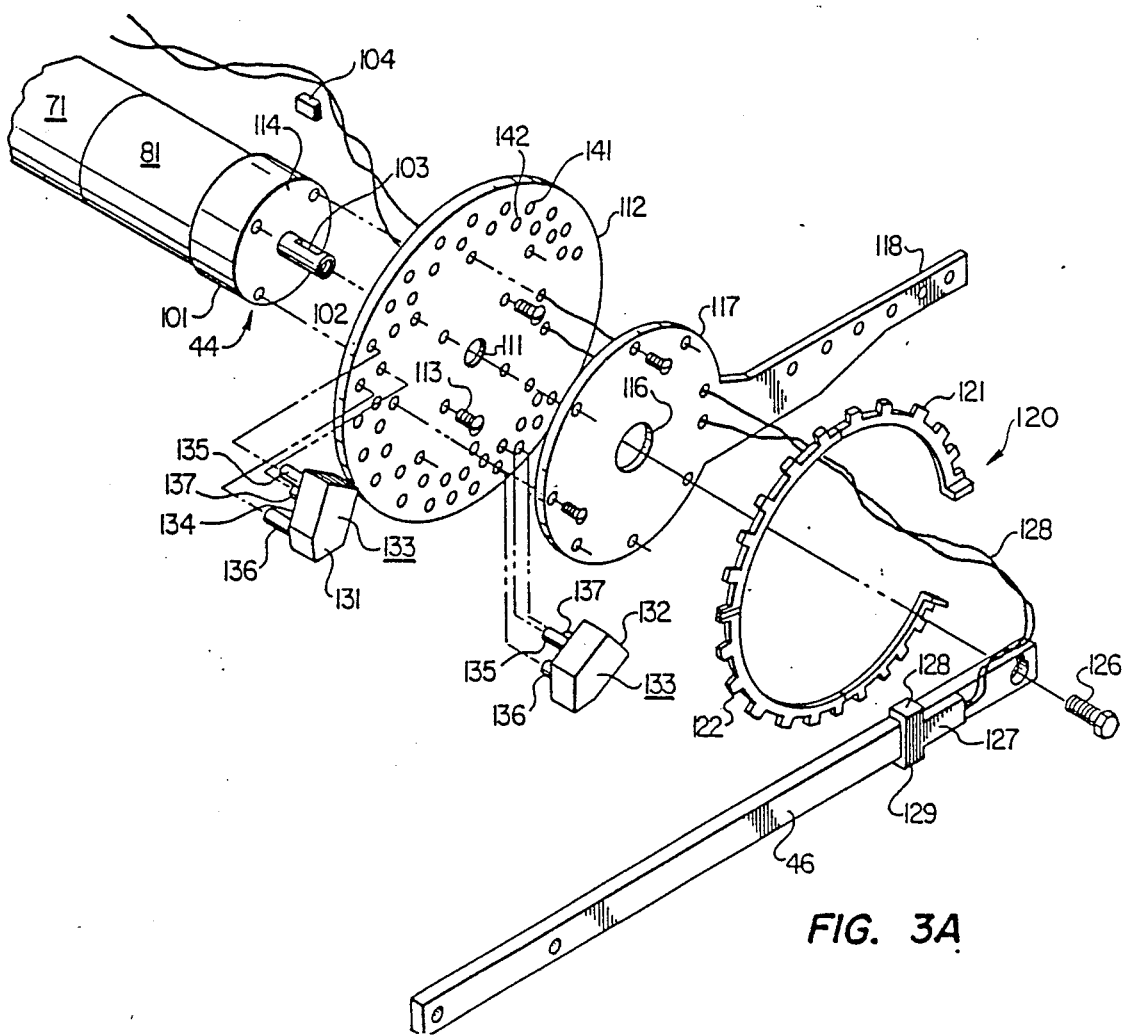
FIG. 3A is an exploded perspective view of the angular position indicating and movement limiting system of the motor assembly of FIG. 2A.

Referring now to FIG. 3A, there is shown an exploded perspective view of another portion of the encoder and motor assembly 41 of FIG. 1. The assembly includes the DC current control motor 71, the angular position encoder 81, and a speed reduction gearbox 44 which includes an output driveshaft 102 having a radially extending slot 103 and an alignment key 104 which is received therein. The transmission gearbox 44 may reduce the rotations of the rotor shaft of the motor to those of the output shaft 102 in a ratio typically on the order of 100 to 1. The output driveshaft 102 extends with clearance through a center hole 111 in an angular position indicating and movement limiting plate 112 which is affixed by bolts 113 to the face 114 of the gear box housing 101. The output drive shaft 102 also extends with clearance through a central opening 116 in a circular support plate 117 for a radially extending support arm 118. A pair of semicircular membrane switch assemblies 121 and 122 are mounted to the face of the position indicating plate 112 as will be further discussed below. The radially extending, exercise arm 46 is rigidly mounted to the end of the torque controlled exercise output driveshaft 102 by means of a bolt 26. The exercise arm 46 extends in a transverse and radially outward direction from the output shaft 102 and moves through precisely the same radial arc by being rigidly fixed thereto. A switch member 127 which includes switches 128 and 129 is fixed to each side of the exercise arm 46 and connected to the external circuitry by means of leads 128.

A pair of position indicating blocks 131 and 132 each include a rigid body portion 133 having a generally flat lower surface 134 from which protrude three perpendicularly extending circular pins 135, 136, and 137. The circular pins are received into the circular apertures 141 and 142 in the angular position indicating and movement limiting plate 112. When the position indicating blocks 131 and 132 are in place with their pins 135-137 extending through apertures 141 and 142 at selected positions on the plate 112, they both transmit data to the control system as to the permissible angular range of arcuate movement to be allowed to the exercise arm 46 as well as physically block any movement of the arm past those preselected angular position by means of the body portions 133 of the position selecting blocks 131 and 132. The physical engagement of the flat undersurfaces 134 of the blocks 131 and 132 with the surface of the membrane switch members 121 and 122 transmit digital information to the control system as to where around the circumference of the plate 112 the blocks 131 and 132 have been selectively located. The operation of the angular position indicating and control mechanism is discussed in more detail below in connection with FIGS. 3B-3E.

As shown in FIG. 3B, the circular plate 112 has an opening at its center 111 through which the output driveshaft of the motor assembly extends. Formed around the periphery of the plate 112 are a plurality of circular apertures 141 which are arranged in an outer circular array equally spaced from one another by an angular distance of 15 degrees. Also formed in the plate 112 is a second inner circular array of circular apertures 142 also arranged angularly spaced from one another a distance of 15 degrees and offset from each of the circular apertures 141 in the outer ring a distance of 7½ degrees. The apertures 142 on the inner ring are radially inwardly spaced from the apertures 141 in the outer ring and/or staggered thereto so that each aperture in the inner ring falls in the space between adjacent apertures in the outer ring. The plate 112 also includes four mounting holes 144 for mounting of the plate 112 to the gearbox housing 101 and mounting holes 145 for mounting of the radially extending support arm 118 and the circular mounting plate 117 thereof to the plate 112.

As shown in FIG. 3C, a pair of semicircular membrane switches 121 and 122 are arranged in a mirror image of one another to extend in a circular array. The switches 121 and 122 each include an enclosed flexible insulative envelope 120 which has an arcuate inner edge and a plurality of radially extending switch position 121a-121m and 122a-122m, respectively. Each of the envelopes 120 enclose four peripherally extending conductors arranged in conductor arrays 151 and 152. The conductors in the arrays 151 and 152 extend through the switch recesses 121a-121m and 122a-122m and form distinct switch closure configurations positioned in each of the recesses so that closure of the switches in any one recess presents a unique four fit digital electrical signal at the output of the lead array 151 or 152. The envelopes 120 have flexible sidewalls so that applying pressure downwardly onto the sidewall of each switch recess, for example switch recess 121d, produces a closure of 1 or more switches enclosed therein to effect a distinctive closure pattern of electrical connections at the output of the lead array 151.

The back side of each of the envelopes 120 of the membrane switches 121 and 122 is covered by an adhesive material so that when the switches 121 and 122 are placed with their adhesive undersurfaces engaging the flat upper surface of the plate 112 (FIG. 3B) the switches are mounted permanently thereto as shown in FIGS. 3D and 3E. The membrane switches 121 and 122 are placed on the plate 112 so that each of the switch recesses 121a-121m and 122a-122m extend between and are centered with respect to each of the circular apertures 141 in the outer ring of apertures formed on the plate 112. In addition, the membrane switches 121 and 122 are sized so that the arcuate interedges of the envelopes 120 are spaced radially outwardly from each of the holes 142 in the inner ring of apertures on the plate and so that the center of each of the switch recesses 121a-121m and 122a-122m lie on a common radius passing through the center of each of the apertures 142 in the inner ring of apertures of the plate 112.

Referring now to FIGS. 3D and 3E, the position indicating blocks 131 and 132 are shown position on the plate 112. The blocks 131 and 132 are fixed to the plate 112 by the insertion of the circular pins 135 and 136 into two of the apertures 141 in the outer ring of apertures and the circular pin 137 into one of the apertures 147 in the inner ring of apertures. The undersurface 134 of the blocks 131 and 132 presses downwardly against the flexible envelope 120 forming the outer housing of the membrane switches 121 and 122 so that switches underlying the blocks are closed to indicate at the lead arrays 151 and 152 of the membrane switches 121 and 122 the angular position of the respective blocks 131 and 132 on the plate 112. For example, as shown in FIGS. 3D and 3E the position indicating block 131 presses downwardly to deform the outer surface of the switch recess 121k of the membrane switch 121 and to produce a distinct digital output signal on the four leads comprising the array 151 to indicate a position indicating block is located at the position corresponding to that switch array. Similarly, the position indicating block 132 is mounted so that its under surface 134 presses downwardly against the flexible outer envelope at the switch recess 122d of the membrane switch 122 to indicate that a position indicating block 132 is at that corresponding angular position around the periphery of the plate 112.

The angular position indicating blocks 131 and 132 also serve a safety function of defining the physical range of movements of the exercise arm 46 by physically preventing the arm from moving through a greater range of arcuate movement than the body portions 133 of the blocks 131 and 132 will allow. This ensures that a damaged joint or muscle group will not be accidentally moved through a greater range of movement than desired.

As shown in FIGS. 3D and 3E, the angular position limit switch 127 includes separate contacts 128 and 129 located on opposite sides of the exercise arm 46 so that when the switch 127 abuts one edge of the position indicating block 131 closure of switch 128 indicates that the arm 46 has reached one extreme of its range of arcuate movement. Similarly, when the arm is rotated in the clockwise direction to its other extreme of angular movement as shown in FIG. 3E, closure of the other contacts 129 on the limit switch 127 sends an indication to the control system that the arm 46 has reached its other extreme of allowable arcuate movement. The angular position indicating blocks 131 and 132 are precisely shaped on their undersurfaces 134 so they cover a 5 degree arc from the center of the holes 142 in the inner ring of holes and which corresponds to the position measured by the position indicating switches 121 and 122.

When the one of the position limit switches 127 on the exercise arm 46 is closed by contacting one of the position indicating blocks 131 or 132 the angular position of the output shaft can be accurately determined by the control equipment. At start-up in the operation of the system, the output shaft is rotated so that the arm 46 is moved either clockwise or counterclockwise depending upon the controlling computer program, until one of the contacts 128 or 129 of position limit switch 127 mounted on the arm 46 closes. At this point, the angular position of the arm 46 is known because of the position indicating stop and the position/velocity counters of the system are set to zero. By counting the number of pulses produced by the angular position encoder 81 affixed to the shaft of the motor, the actual position of the arm 46 can be accurately determined at any moment by the computer. Also, by comparing pulses from the shaft position encoder to clock pulses generated by the internal circuitry of the control system, the velocity of the output driveshaft 102 can also be precisely determined. As discussed above, the output pulse detecting devices of the angular position encoder 81 are mounted slightly ahead of one another. If the shaft is rotating away from the starting position (established at zero reference pulse count) the difference of these two pulse counts will be positive. If the shaft, however, is rotating toward the starting position, the difference of these two pulse counts will be negative. Thus, the computer can determine the direction and velocity of rotation of the shaft and the angular arcuate position of the driveshaft 102 and arm 46 at any time during use of the system. When the rotating driveshaft 102 returns to its starting position so that the arm 46 is adjacent one or other of the blocks 131 and 132 the control counter is reset to zero to prevent errors from being caused by missing or extra pulses from accumulated during more than one repetition cycle of the movement of the arm.

If the arm position reference switches 128 or 129 remain closed longer than a predetermined period of time due to a control malfunction, or for any other reason, the motor drive current of the system will be turned off by the control computer. In addition, if either one of the position indicating blocks 131 and 132 is not firmly inserted into the angular position indicating plate 112 so that switches within the membrane switches 121 and 122 are not closed, the system also will not operate. The ends of the pins 135-137 include recesses to receive detents or stops at the ends thereof on the back sides of the position indicating plate 112 so that once the blocks 131 and 132 are in position, they cannot be accidentally dislodged.

The position indicating switches 121 and 122 and blocks 131 and 132 provide a virtually fail safe position determining mechanism which provides information to the computer to prevent it from allowing rotation past a given arcuate point. Moreover, the mechanism physically prevents any movement of the exercise arm past those arcuate positions in the event some malfunction in the program would electronically allow that to happen.

Control System

Figure 4:
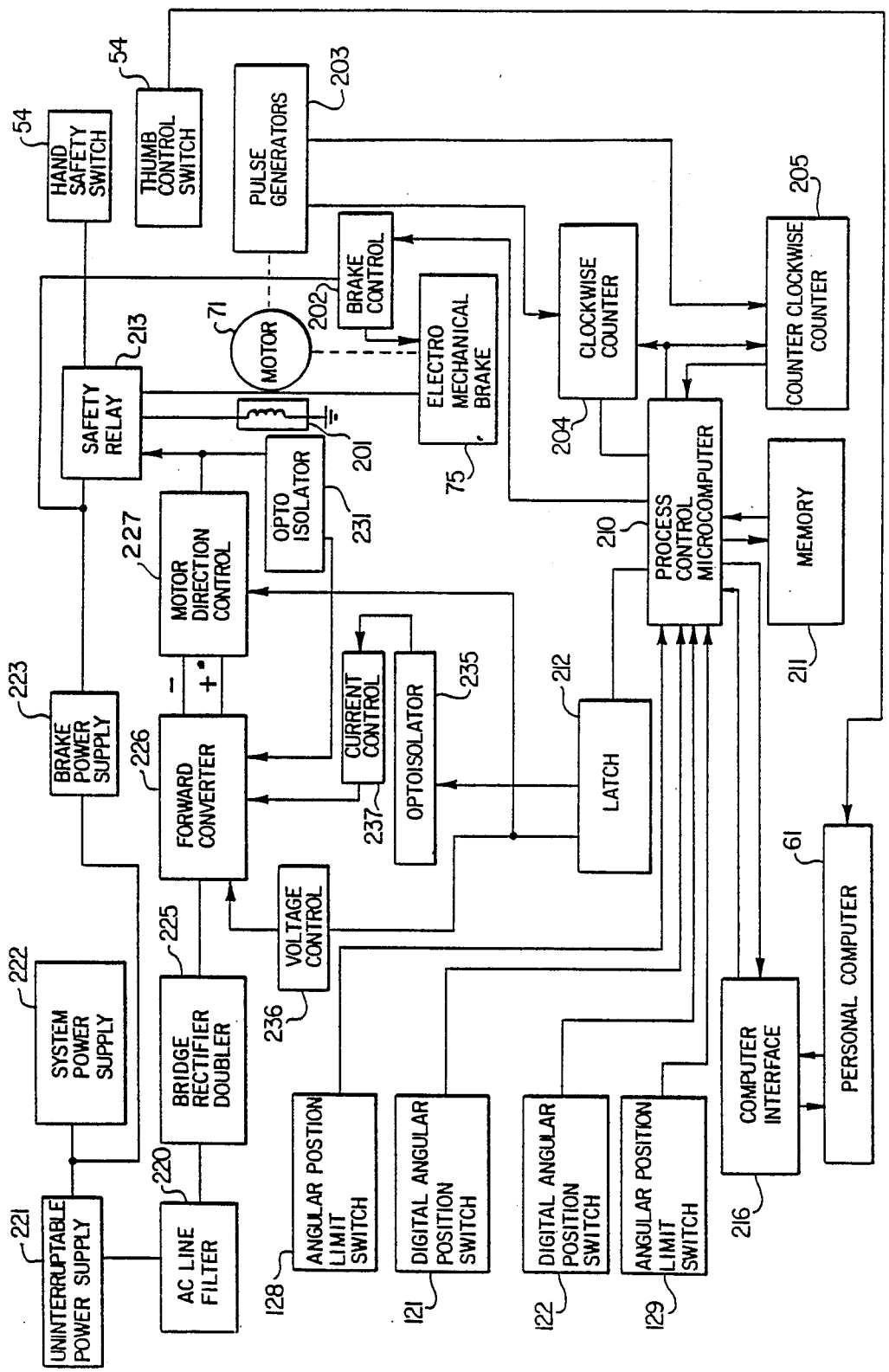
FIG. 4 is a block diagram of the single axis exercise system shown in FIG. 1.

Referring now to FIG. 4, there is shown an overall block diagram of the control arrangement of a single axis embodiment of the exercise system of the present invention. The permanent magnet DC control motor 71 includes a control winding 201 the current flow through which controls the direction of rotation and the torque of the rotor shaft of the motor and therefore the driveshaft coupled thereto. An electromechanical brake 75 is mechanically coupled to the rotating shaft of the motor 71 so that when actuated by the brake control unit 202, the brake 75 prevents rotation by the motor shaft. A pulse generator assembly 203 is coupled to the output of the shaft of the motor 71 and serves to generate a train of electrical output pulses as the shaft of the motor rotates. The output of the pulse generators 203 is connected to a counter 204 and a counter 205 which monitor the angular position and velocity of movement of the shaft of the motor 71. The counters 204 and 205 are connected to each other and to a process control microcomputer 210 which may comprise, for example, a conventional Z8 computer chip such as the model Z8 microcomputer manufactured by Zilogue Corporation. The process control microcomputer 210 is also connected to a memory 211 and to latch circuitry 212.

The current winding 201 of the motor 71 is connected directly through a safety relay 213 which is preferably of the double-pole double-throw type and which is actuated under control of the hand safety switch 54. The hand safety switch 54 is included in the unit 52 held in the hand of the user and unless closed by the user the safety relay 213 is in the unoperated position and interrupts all current supply to the motor coil 201 and connects current to actuate the electromechanical brake 75.

The process control microcomputer 210 receives input signals from the angular position limit switch 128 which establishes the limit of angular movement which the driveshaft 102 and exercise arm 46 may move in the clockwise direction. The microcomputer 210 also receives a similar input from the counterclockwise angular position limit switch 127 having switch closure contacts 128 and 129. When either of these two switches 128 and 129 are actuated, the microcomputer 210 is notified of the fact that the exercise driveshaft 102 and arm 46 have reached the limit of their permissible arcuate movement in either the clockwise or counterclockwise directions. The process control microcomputer 210 also receives inputs from the digital angular position switch 121 and the digital angular position switch 122. Each of these switches provide a digital indication of the limits of angular movement permissible by the driveshaft 102 and exercise arm 46 based upon the positioning of the position limiting blocks 131 and 132. The angular position indicating switches and limiting switches are discussed above in connection with FIGS. 3A-3E.

In a multi-axis embodiment of the system, discussed below, the computer 210 receives input from a linkage position indicating switch 294 associated with the exercise arm of each axis of movement. The arms for certain axes of movement include adjustable linkages and the switches 294 advise the process control computer 210 the status thereof.

The process control microcomputer 210 is also coupled to a personal computer 61 through a computer interface 216. The personal computer 61 may be any one of the type conventionally used for general purpose computer functions. It may be conveniently of the type which is compatable with IBM PC software. The computer interface 216 is preferably of a RS 232 type interface which conventionally interconnects a Z8 microprocessor with IBM PC system compatable software.

An AC power source is directed thorough an AC line filter 220 and an uninterruptable power supply 221 to a system power supply 222. The system power supply preferably provides plus or minus 5 volts and plus or minus 12 volts to power all of the control system power requirements. The output of the uninterruptable power supply 221 is also connected through a brake power supply 223 to the brake control unit 202. In the event of an interruption in line current, the brake power supply 223 enables the brake control unit 202 to apply the electromechanical brake 75 to the rotor of the motor 71 and shut the system down because of inoperability of the control circuitry. The output of the AC line filter 220 is connected to a bridge rectifier/doubler 225 the output of which is connected to a transformer isolated current mode power supply such as a forward convertor 226. The forward convertor 226 includes both a positive and a negative output signal to a motor direction control circuit 227. The output of the direction control circuit 227 is coupled through the contacts of the safety relay 213 into the motor winding 201. Thus, no current can be fed from the motor direction control circuit 227 to the motor winding 201 unless the hand safety switch 54 is held in the actuated position by the user. The output of an opto-isolator 231 is fed back through line 232 to the forward convertor 226.

The process control microcomputer 210 is connected through latches 212 the output of which is connected to an opto-isolator 235 and a voltage control circuit 236. The output of the opto-isolator 235 is coupled through a current control circuit 237 to the forward convertor 226 by means of a lead 238.

The personal computer 61 may be communicated with by the user by the means of thumb control switch 51 to provide answers to inquiries by the computer with respect to operation of the device by the user, or as more fully discussed below.

The process control microcomputer 210 is provided with data relative to the desired torque and speed of the exercise motor 71 from the personal computer 61 through the RS 232 interface 216. This information is stored in memory 211 and on command, is output by the microcomputer 210 into the latch 212. Opto-isolators 235 and 237 input to the forward convertor 226 an indication of the desired motor torque. Voltage control circuit 236 provides an indication of desired motor speed to the forward convertor 226 during starting. Motor direction information is provided to the motor direction control circuit 227 by the output of the latches 212. Actual current through motor winding 201 is set by means of opto-isolator 231 which provides a voltage feedback signal over lead 232 to the forward convertor 226 to prevent the voltage across the windings of the motor from rising above a selected value, nominally on the order of 40 volts.

The process control microcomputer 210 receives input from the counters 204 and 205 and based upon the process control software which is also stored in the memory 211 constantly varies the information provided to the latch 212 to provide continuous control over the direction, speed, and torque of the motor as a function of position of the motor shaft as well as the performance of the user as force is exerted onto the exercise arm.

Motor Control Circuit

Figure 5B:
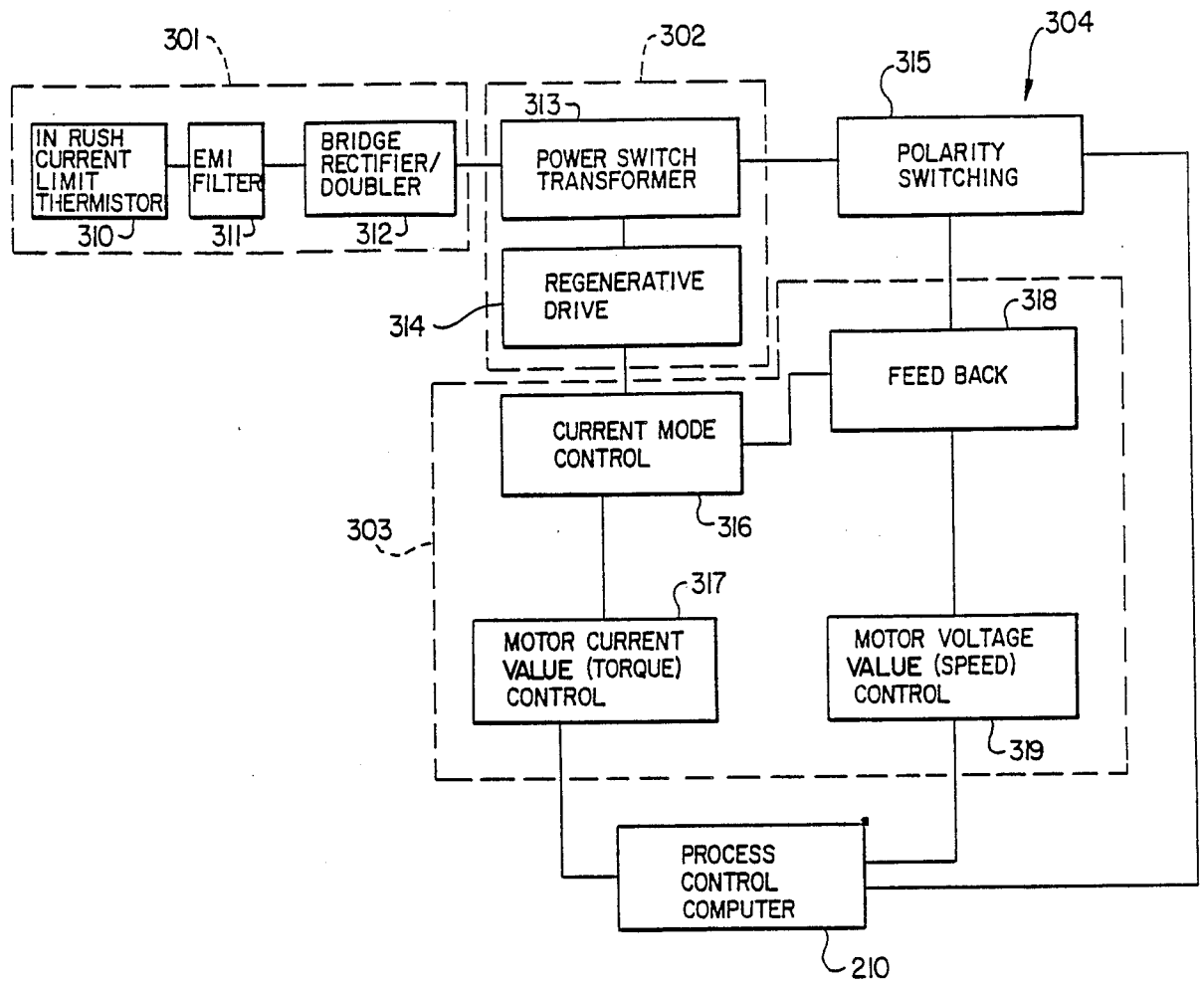
FIG. 5B is a block diagram of a motor driver circuit for the single axis embodiment of the system of the invention shown in FIG. 1.
Figure 5A:
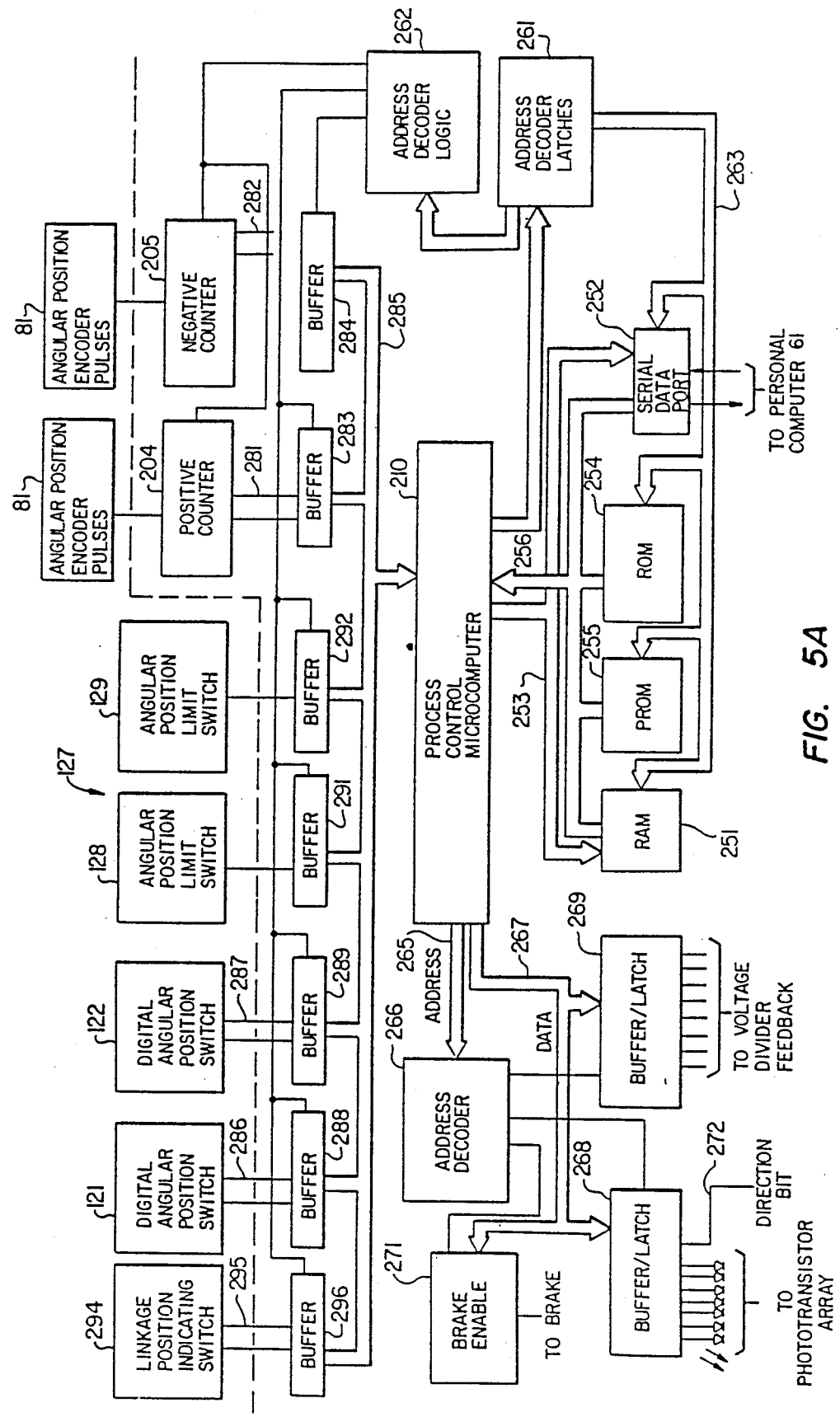
FIG. 5A is a block diagram of a motor control circuit for the single axis embodiment of the system shown in FIG. 1.

Referring now to FIG. 5A, there is shown a block diagram of the digital controller circuitry employed in the system of the present invention. There it is shown that the process control microcomputer 210 is connected to output digital data to a random access memory (RAM) 251 and to a serial data port 252 by means of an output bus assembly 253. Similarly, the process control microcomputer 210 may receive information from a read only memory (ROM) 254, a programmable read only memory (PROM) 255 and the serial data port 252 by means of an input bus assembly 256. The serial data port 252 may comprise a conventional universal synchronous asynchronous receiver transmitter terminal (USART). The serial data port 252 is connected to the personal computer 61 used in conjunction with the present invention. The process control microcomputer 210 is also connected to an address decoder latch assembly 261 which is in turn connected through an address decoder logic circuit to the peripheral input switches and measuring devices. The address decoder latches 261 are connected by means of a bus 263 to select ones of the RAM 251, PROM 255, ROM 254, and serial data port 252 for communication with the process control microcomputer 210. It should be understood that one of the components such as the RAM 251, the ROM 254, the serial data port 252 and the address decoder latches 261 may be included as an intergal part of certain microcomputers such the model Z8.

The microcomputer 210 is also connected by an address bus 265 to an address decoder 266 and by a data bus 267 to a pair of buffer/latches 268 and 269 and a brake enable circuit 271. The address decoder 266 selects which ones of the peripherial units of the brake enable circuit 271, the buffer/latch 268 and the buffer/latch 269 are enabled for data communication with the microcomputer 210 by means of the data bus 267. The output of the buffer/latch 268 is connected to the phototransistor array associated with the opto-isolator and includes a direction bit coupled over lead 272. The output of the buffer/latch 269 is connected to the voltage divider feedback circuitry.

A number of peripheral switches and measuring circuits are connected by means of buffers to the process control microcomputer 210. Angular position encoder pulses from the motor shaft position encoder 81 are coupled into a positive counter 204 and a negative counter 205. The data output from counters 204 and 205 are connected via buses 281 and 282 and buffers 283 and 284, respectively, to the process control microcomputer monitor bus 285. The digital angular position switch 121 and the digital angular position switch 122 are connected, respectively, by buses 286 and 287 and buffers 288 and 289 to the microcomputer monitor bus 285. Similarly, angular position limit switches 128 and 129 have outputs which are connected through buffers 291 and 292 into the microcomputer monitor bus 285 while the linkage position indicating switch 294 is connected over bus 295 and buffer 296 into the monitor bus 285. The address latches 261 and address logic 262 select which of the buffers 283, 284, 288, 289, 291, 292, and 296 are selected for communication with the process control microcomputer 210 via the monitor bus 285.

Thus, the process control microcomputer 210 receives information from its memory components 251, 254, and 255 as well as the personal computer via serial data port 252 and based upon stored programs and information input to it with respect to the performance of the user monitored over monitor bus 285, provides output control information over output bus 267 to control the direction, speed, and torque of the motor as well as whether or not the motor is disabled from operation by engagement of the electromechanical brake.

Motor Driver Circuit

Referring now to FIG. 5B, there is shown a simplified block diagram of the motor driver circuitry. The motor driver circuit consists of an input section 301, a power switching and output filter section 302, a control feedback section 303, and an output polarity select section 304. The input section 301 consists of an in-rush current limiting thermistor 310 the output of which is connected through an electromagnetic interference filter (EMI) filter 311 into a bridge rectifier/doubler 312. The output of the input section 301 is connected into the power switching and output filter section 302 consisting of a power switching transformer circuit 313 which is connected to a regenerative drive circuit 314. The output of the power switching and output filter section 302 is connected both an output polarity select section 304 which consists of a polarity switching circuit 315 and to a control feedback system 303. The control feedback section 303 comprises a current mode control unit 316 which is connected from the regenerative drive 314 and serves to provide an input to the motor current value control unit 317 which controls motor torque. The polarity switching circuitry 315 is connected to a feedback circuit 318 the output is connected to provide control feedback to both the current mode control 316 as well as the motor voltage value control circuit 319 which controls the maximum value of voltage to the motor windings. The polarity switching circuit 315 as well as the motor current value control circuit 317 and the motor voltage value control circuit 319 are coupled to the process control computer 210.

Within the input section 301, a fuse acts as a safety device which prevents large continuous current such as due to component failure, or to any other condition which would cause a high current flow and damage the other circuits. The EMI filter 311 compensates for the power switching section which generates large switching spikes due to rapid turning on and off of high current levels through an induction coil. This switching of currents can cause electrical interference to be conducted back to the AC line source. The function of the EMI filter is to reduce these voltage spikes to acceptable levels.

The bridge rectifier 312 converts the 60Hz AC input voltage into pulsating DC and for a standard 220 volt line, the bridge rectifier 312 is configured as a standard bridge giving an output voltage of 1.414 times the RMS AC line voltage value or approximately 300 volts. For a 125 volt input line the bridge rectifier 312 is configured as a voltage doubler, giving 2.8 times the input voltage or approximately 300 volts. The bridge rectifier 312 also includes filter capacitors which convert the pulsating DC from the rectifiers into DC current with some ripple. The power switching section 302 converts the nominal 300 volts into a positive and negative DC voltage with a maximum peak current of approximately 15 amps and a maximum plus or minus 40 volts.

Figure 5C:
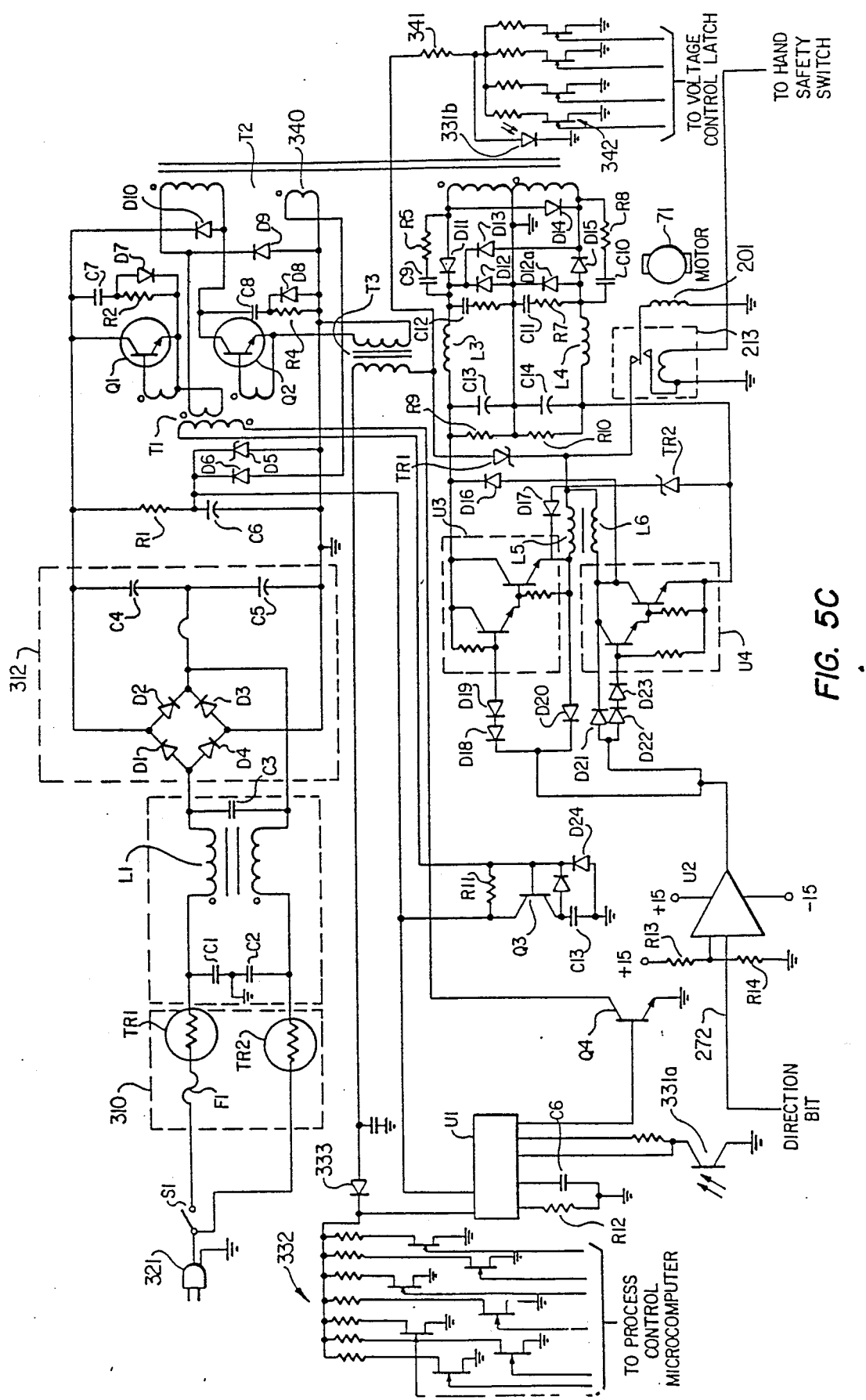
FIG. 5C is a schematic diagram of the motor driver circuit of the motor control circuit shown in FIG. 5B.

Referring now to FIG. 5C, there is shown a detail schematic drawing of the motor driver circuit used to provide current mode control to the DC motor used in the system of the present invention. An AC power source 321 is coupled through a switch S1 into the input of the input current limiting and protection section 310 which consists of a fuse F1 and a pair of thermistors TR1 and TR2, one connected in each side of the line. The output of the current limiting section 310 is coupled to the input of the EMI filter section 311 which consists of a pair of input capacitors C1 and C2 coupled across a common mode choke L1 the output of which has a capacitor C3 connected thereacross. The output of the EMI filter section 311 is connected to the input of the bridge rectifier section 312 consisting of 4 diodes D1, D2, D3, and D4 the outputs of which are connected across a pair of filter capacitors C4 and C5 which provide a rectified and filtered DC signal to the input of the power section. The power section of the motor driver control circuit consists of a power transformer, a regenerative drive and an output filter. The primary power section includes a power transformer T2 and a pair of power transistors Q1 and Q2 which are series connected with the secondary of a regenerative drive transformer T1. A snubber network is connected across the outputs of each of the two power transformers Q1 and Q2 and comprise, respectively, R2, C7, and D7 for the output of Q1 and R4, C8, and D8 on the output of Q2. The emitter of power transistor Q2 is connected in series with the primary winding of a current sensing transformer T3. Flyback clamp diodes D9 and D10 are connected across the windings of the power transformer T2, while input diode D5 and zener diode D6 are connected to the control voltage rail along with input current limiting resistor R1 and start up voltage capacitor C6.

Connected to the output of the power transformer is an array of output rectifier diode D11, D12, D13, D14, and D15. Output rectifier snubber networks R5 and R6 along with capacitor C9 and C12 are connected to one side of the output circuitry while output snubber networks comprising resistor R7 and C11 together with resistor R8 and capacitor C10 are connected to the other side. The positive side of the output circuit is connected through a coil L3 while the negative side of the output is connected through a coil L4 across which are coupled filter capacitor C13 and C14 and minimum load resistors R9 and R10.

The output polarity switching subsection of the power section comprises power hybrids U3 and U4 which are series connected with current limiting coils L3 and L4 along with baker clamps D18, D19, and D20 for hybrid U3 and D21, D22, and D23 for hybrid U4. Free-wheeling diodes D16 and D7 are connected across the power hybrids U3 and U4 which may comprise respectively, for example, models 645 and 646, made by Unitrode. A phototransistor 331a of the opto-coupler circuitry, the photodiode of which is shown at 331b is coupled through the current mode control chip U1, which may be a model 1846 manufactured by Unitrode.

A direction bit lead 272 from the buffer latch (268 of FIG. 5A) is connected to the input of a power operational amplifier U2 the other input of which is set at a voltage level by voltage dividers R13 and R14.

The control section of the motor driver circuit of FIG. 5C consists of the secondary of the current sensing transformer T3 which produces a voltage representative of the current through the primary and is connected to the input of the current mode control chip U1 through the diode 333. The ratio of the voltage going to the control chip U1 is controlled by variable burden resistor network 332. The gates of the field effect transistors of the variable burden network 332 go to the phototransistor array connected to the buffer/latch 268 of FIG. 5A.

The chip U1 has a timing resistor R12 and a timing capacitor C16 connected thereto. A transistor Q4 is connected to the chip U1 the and output of which is connected across the secondary of the regenerative drive transformer T1.

Figure 6:
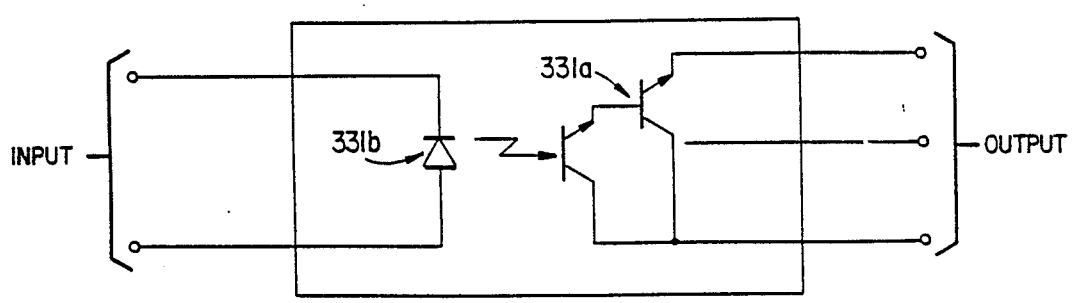
FIG. 6 is a schematic illustration of an optocoupler circuit used in the motor control circuit.

The current mode power supply of FIGS. 5A–5C is transformer isolated and the safe relatively low output going to the motor windings 201 is completely electrically isolated, with respect to DC current, from the dangerously high line voltage at 321 by the phototransistor array and the opto-isolator 331a–331b. The electrically isolating nature of an opto-isolater including a Darlington connected phototransistor embodiment is illustrated in FIG. 6.

The motor driver circuit of FIGS. 5A–5C includes a modified two transistor forward convertor which operates at a nominal switching frequency of 40KHz and which produces a maximum of plus or minus 40 volts and plus or minus 15 amps to the current winding 201 through the safety relay 213. Power coupled through switch S1 passes through fuse F1 and into thermistors TR1 and TR2. When the AC current is first applied, the AC filter capacitors C1 and C2 act like a dead short and produce a very large current surge until they are charged. Since thermistors TR1 and TR2 are cold they have a very high resistance and limit this in-rush of current. As the current continues to flow through the thermistors TR1 and TR2 they heat up, decrease their resistance and, thus, limit the start up current but do not dissipate a large amount of power during normal running conditions. The filter section consisting of filter capacitors C1, C2, and C3 and inductance L1 serves to limit the amount of electrical interference coupled back into the AC line source due to the rapid switching on and off of large values of current through an inductor in the power switching section. The EMI filter 311 reduce these current spikes to acceptable levels. The rectifier/doubler 312 which consists of diodes D1, D2, D3, D4, and output filter capacitors C4 and C5 convert the 60Hz line current into pulsating DC the output of which is approximately 300 volts for both a 220 volt input as well as a 125 volt input line.

The power switching section converts the nominal plus 300 volt rail voltage into a positive and negative DC voltage with a maximum peak current of 15 amps and a maximum plus or minus peak voltage of 40 volts. This circuit is composed 3 subsections a primary side switching section, a regenerative drive section, and a output rectifier filter. The primary side switching section consists of power switching transistors Q1 and Q2 which are connected in series with the primary of power transformer T1. The DC rail voltage is converted to pulses by switching these transistors simultaneously completely on and completely off. By controlling the ratio of the time on to the time off, i.e. the duty cycle ratio, the ratio of input voltage to current on the one hand to output voltage to current on the other hand can be precisely controlled since changing the duty cycle ratio has the same effect as changing the turns ratio of a transformer.

In order reduce the peak voltage seen by the power transistors Q1 and Q2 the two are connected in series so that peak voltage rating requirements for each one are reduced in half. The flyback voltage when the power transformer T2 resets is returned to the DC rail by flyback clamp diodes D9 and D10. At start up, power from the DC rail is current limited by R11 and capacitor C5 stores enough energy to power the regenerative drive until the voltage from the primary auxillary winding 340 is sufficient to power the primary side of the control circuit.

The snubber networks, C7, D7, and R2 connected across power transistor Q1 and R4, C8, and D8 connected across power transistor Q2 protect the power transistors during the turn-on and turn-off thereof thereby preventing inductive spikes from exceeding the safe operating limit of the transistors. The regenerative drive subsection of the power section of the motor driver circuit of FIGS. 5B and 5C operates so that when the driver transistor Q4 is on, the power transistors Q1 and Q2 are off. The magnetizing current in the control winding of the regenerative drive transformer T1, approaches a limiting value equal to the control circuit voltage divided by the current limiting resistor R1. Capacitor C13 is discharged at this time. The only voltage on any winding of the regenerative drive transformer is due to wire resistance. When the output from the control chip U1 becomes high, the driver transistor Q4 turns off and the energy stored in the inductance of regenerative drive transformer T1 causes a flyback voltage to be developed on all windings of the transformer T1. This voltage momentarily forward biases the base-emitter diodes of the power transistors Q1 and Q2, and collector current starts to flow. The collector current value divided by the turns ratio of the regenerative driver transformer T1 also flows to the base of power transistors Q1 and Q2. The ratio of base current to collector current set by the turns ratio of the drive transformer T1 is slightly more than the minimum beta of driver power transistors Q1 and Q2. Thus, once turned on, the current through Q1 and Q2 rapidly increases until these transistors are completely turned on. During the time that the power transistors Q1 and Q2 are on, control transistor Q4 is off, and current through R11 and R1 is multiplied by the gain of transistor Q3 rapidly charging capacitor C13. At the end of the on period, the control circuit turns off which in turn turns on drive transistor Q4 applying the voltage stored in the capacitor C13 to the regenerative drive transformer T1 driving the bases of power transistors Q1 and Q2 sharply negative. This negative voltage on the base of power transistors Q1 and Q2 turns both of them rapidly off as the turn-off current pulse is much large than the base current through the transistors Q1 and Q2. Thus, turn-off time is very rapid.

When the power transistors Q1 and Q2 are off, no base current flows, and any remaining voltage from capacitor C13 flows through the regenerative driver transformer T1 adding to the energy stored in the transformer inductance. The diode D24 prevents driving the upper end of the regenerative driver transformer negative. After start up, the power transistors Q1 and Q2 are alternately switched on and off in a manner described above until source power is removed.

The output from the secondary of the regenerative drive transformer is center tapped and produces an output voltage/current of equal amplitude but of opposite polarity. Diodes D11 and D15 are forward biased when the switching power transistors Q1 and Q2 are on. Current flows through these diodes and the filter inductors L3 and L4 so that the voltage across these inductors is positive thereby reverse biasing the free-wheeling diodes D12 and D13. When the power switching transistors Q1 and Q2 turn off, the voltage developed by the secondary of the output power transformer T2 reverses polarity as the transformer resets. The diodes D11 and D15 are then reversed biased and the voltage across filter inductors L3 and L4 also reverses polarity forward biasing the free-wheeling diodes D12 and D13 and thus, allowing current to continue to flow in the inductors. The snubber networks R5, C9, and D11 in one side of the secondary and R8, C10, and D15 in the other side prevent large inductive spikes from occurring due to diode transition times.

The output voltage from the secondary of the power transformer T2 is smoothed by filter capacitor C13 and C14 while minimum load resistors R9 and R10 provide a minimum load resistance and thus prevent switching noise from charging the output filter capacitors to a damaging level and, further, allow a minimum current to flow through filter inductors L3 and L4.

Two special zener diodes TR1 and TR2, known as transorbs, are specifically designed to fail to a shorted condition, should the voltage across them rise above a specified level, i.e. 40 volts. These diodes guarantee that no potentially hazardous voltages are developed on the secondary, and hence, user accessible, side of the power transformer.

The output voltage from the forward convertor of FIG. 5C is determined by the ratio of the time the power transistors Q1 and Q2 are on, as compared to the time they are off. The control section precisely sets this ratio on a cycle-by-cycle basis 40,000 times per second allowing very precise control of the peak output voltage and peak output currents. The control section of the circuitry of FIG. 5C uses what is known as current mode control which consists of a primary feedback loop which senses the current through primary of power transformer T2 and a secondary loop which senses the output voltage on the secondary of power transformer T2. The specialized current-mode control chip U1, incorporates an oscillator, power transistor drivers, a current sense comparator, a feedback voltage operational amplifier, and a precision voltage reference.

The operation of the current sensing loop is such that when power transistors Q1 and Q2 are on, current flows through the primary of the power transformer T2, the regenerative drive transformer T1 and the current sensing transformer T3. Because of the inductance in these transformers, the current will ramp in a linear fashion and be divided in a 200 to 1 ratio by the current sensing transformer T3. This current is then rectified by the diode 333 and converted into a voltage by controllable burden resistor network which consist of field effect-transistor resistor pairs 332. Depending on the binary combination of the state of these seven transistor/resistor pairs, the burden resistance of the current sense transformer T3 is computered control, thus allowing an adjustable limit to 1 of 128 different levels. When the voltage level representing the intercurrent loop reaches the reference voltage value, a comparitor causes the output drivers of control chip U1 to change state and power transistors Q1 and Q2 are latched off until the internal clock of the control chip U1 turns them back on again. The control chip oscillators configured so that if the output transistors are not turned off before the duty ratio reaches 50 percent, then the chip switches them off automatically thus allowing all transformers to be properly reset.

The peak output voltage from the motor driver circuitry of FIG. 5C is controlled by a second feedback loop opto-isolated from the primary control section. The feedback consists of the output voltage divided by a computer controlled voltage divider network. The output of this voltage divider network is set at the level of the voltage reference contained in the control chip U1. By changing the ratio of these resistors, the peak output voltage can be changed. The ratio of this network resistance is computer controlled by having a fixed resistor 341 in a series with parallel combination of series connected resistor field-effect transistor combinations the resistance of which depends upon the binary combination of the state of the resistor/field effect transistor network 342. The effective ratio of the voltage divider network is controlled by the process control computer. If the output voltage which is fed to the primary circuit through an isolation network rises above the reference voltage at the noninverting input of the feedback operational amplifier contained in U1, the output of this amplifier will be driven to a lower level which is determined by the gain of the operational amplifier. This voltage is used as a reference voltage for the intercurrent loop comparitor. If the current limit section does not allow full output voltage to be reached at the current level desired, then the reference voltage will be left in its highest level.

In the output polarity switching section, the convertor generates a plus and minus nominal 40 volts. The direction of the motor torque is determined by which polarity from the convertor is selected. This is accomplished by power operational amplifier U2 powered by a plus and a minus 5 volts from an auxillary power supply turning on Darlington hybrid circuits U3 and U4, depending on whether the direction bit on lead 272 from the control computer is high or low. Diodes D18 to D23 form baker clamp circuits allowing fast switching response of the Darlingtons. Coils L5 and L6 limit current spikes during cross conduction time. The diodes D16 and D17, which are part of the Darlington hybrids U3 and U4 are free-wheeling diodes which prevent inductive turn-off voltage spikes due to the high inductance of the motor field winding coil 201.

Thus it is seen that the process control microcomputer 210 maintains very precise control over the polarity, voltage and current of the signal which is delivered to the winding 201 of the motor 71. This enables the computer to precisely vary the torque of the motor and almost instantaneously make precise changes therein so as to conform to the requirements of the program as well as the responses of the user as the system is operated.

A safety feature of the present invention is an uninterruptable power supply for providing power to the eletromechanical brake in the event of a line power failure. This prevents the weight of motor assemblies from injuring a user after a sudden power outage.

Uninterruptable Power Supply Circuit

Figure 7:
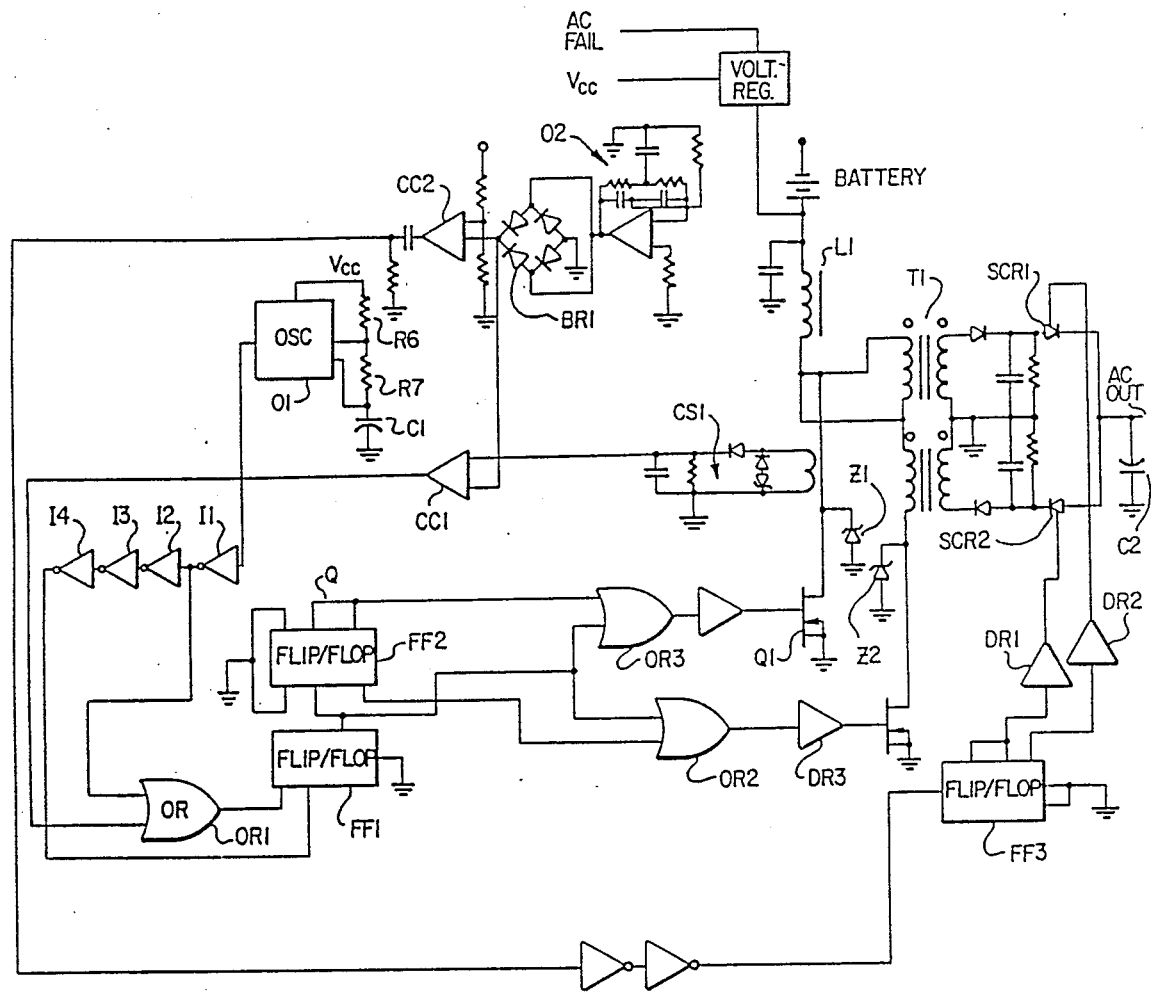
FIG. 7 is a schematic diagram of an uninterruptable power supply used in conjunctioned with the exercise system of FIG. 4C.

Referring next to FIG. 7 of the drawing there is shown an uninterruptable power supply used in conjunction with the system of the present invention. The basic circuit topology of the uninterruptable power supply is called a push-pull boost circuit. It consists of an inductor feeding a center-tapped transformer with both legs of the transformer primary shorted simultaneously to ground to start a current flowing through the coil. Turning each leg of the transformer alternately on and off generates a boost voltage according to the ratio of 1 divided by 1 minus the duty cycle $(1/1-D)$. The inductor may be a separately wound inductor or the series leakage inductance of the output transformer. The waveform present at the transistor switches connected to each leg of the transformer is in the form of: both transistors on; alternately one transistor off and both transistors on again; and finally the other transistor off. By controlling the ratio of the time both transistors are on to the time each side is alternately off, the output voltage can be very precisely controlled.

The control circuit which accomplishes this end is shown in FIG. 7 and include a square wave oscillator circuit which is composed of a timer oscillator O1 which generates a square wave whose maximum duty cycle is set by the ratio of the timing resistors R6 and R7 and whose frequency is set by the series combination of those resistors and capacitor C1. This signal inverted by the inverter I1 of the octal inverter network and the or-gate OR1. The signal is delayed and restored to its original polarity by the remaining 3 inverter gates I2, I3, and I4, of inverter network. This delayed signal then goes to the clock input of a flip-flop FF1, which may be a type 4013 "D" flip-flop manufactured by Motorola. The other input to the or-gate OR1 is connected to a current comparitor CC1. This comparitor CC1 is tripped when the output voltage from the current sensing network CS1 exceeds a certain level. When either of these inputs, i.e. the current sense comparitor or the inverted oscillator signal from I4 goes high, the flip-flop FF1 is set low and then latched low until the delayed output signal from the oscillator O1 goes high again and resets the latch. The last two inverters I3 and I4 form a delay network such that the reset signal delayed by or-gate OR1 occurs before the output the timer goes high again. The output from this latch FF1 is simultaneously fed to each input of the or-gates OR2 and OR3. The output of the or-gates OR2 and OR3 drive the output switches Q1 and Q2 on and off. The output signal from latch FF1 also goes to the clock input of another flip-flop FF2. This flip-flop FF2 is configured as a divide by 2 counter. The inverting and noninverting leads Q and $\overline{Q}$ go individually to inputs of or-gates OR3 and OR2.

The uninterruptable power supply circuit of FIG. 7, thus turns both driver transistors Q1 and Q2 on until either the preset current limit, or the maximum duty cycle set by the timer oscillator O1 is reached, and then turns the or-gate OR2 off, turning off FET switch Q2. Or-gate OR2 is latched off until the rising edge of the next cycle from the timer O1 is generated, turning both or-gates OR2 and OR3 on again. When the current sense comparator CS1 goes high or the maximum duty cycle set by the O1 timer is reached, the Q output from flip-flop FF1 goes low and flip-flop FF2 changes state so that or-gate OR3 is switched off, in turn turning off FET switch Q2. This process will continue until the circuit is shut down. At shut down, both or-gates OR2 and OR3 are off turning off both FET switches Q1 and Q2. The energy stored in the boost coil L1 must go somewhere so transorbs Z1 and Z2 are placed in parallel with each leg of the output transformer T1. These transorb devices Z1 and Z2 conduct above a certain voltage level and thereby prevent damaging voltage spikes at shut down.

The convertor in this configuration converts a DC level into a DC level of higher amplitude out. In order to generate AC out, a 60$H_Z$ sigewave oscillator O2 is fed into a bridge rectifier BR1. The output pulses from this rectifier BR1 are fed into the reference input of the current sense comparator CC1. A second comparator CC2 which is referenced near ground generates a short duration pulse at the end of each half cycle. This output pulse triggers a flip-flop FF3 configured as a divide by 2 counter. The outputs from this counter FF3 go to the SCR1 and SCR2 through drives DR1 and DR2. Since the output transformer T1 is center-tapped, output pulses of both positive and negative polarity are generated. During the first half of the sine wave cycle SCR1 is enabled, thereby allowing the positive sine wave shaped pulse to be generated. During the second half of the cycle, the flip-flop FF3 changes states, triggered by a pulse from pulse low crossing detector CC2 and switches on SCR2, while switching off as SCR1. A negative sine wave shaped pulse is thus generated at the output. An output filter capacitor C2 filters out the high frequency switching pulses and only allows the 60$H_Z$ AC signal to pass.

An AC fail detect circuit (not shown) turns on the battery backup system when the power is lost and turns off the system when the power is restored.

System Modes of Operation

Figure 8:
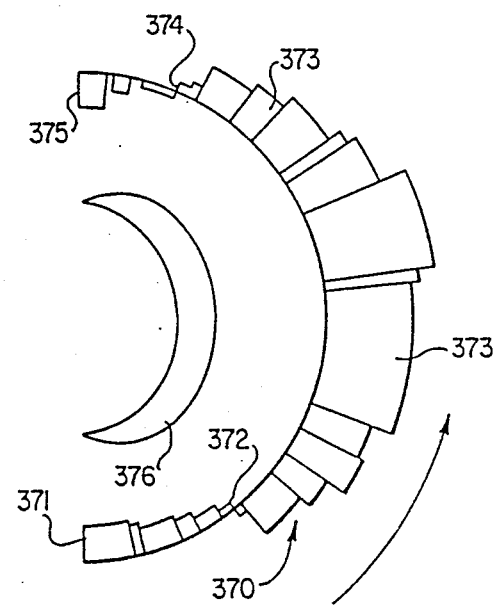
FIG. 8 is an illustrative video display of a torque/velocity/angle performance diagram produced in the operation of the system of the invention shown in FIG. 1.

Referring next to FIG. 8, there is shown a diagram of the screen display of torque and velocity variations as a function of angular position which display is produced by the personal computer of the system of the present invention in response to control signals sent to it by the process control microcomputer. As shown there, the torque and velocity performance curves of the user is plotted in polar coordinates. Pairs of these curves may be generated to indicate both desired performance as well as actual performance by the user for direct comparison, in different colors, for example.

As shown in FIG. 8, the curve 370 is a plot which illustrates the variations in torque values which were necessary to maintain a constant velocity of the driveshaft over an angular range of movement. The regions portion of the plot 371 could illustrate positive movement assisting torque, the point 372 zero torque and the regions 373 varying values of movement resisting torque. Point 374 is zero torque again with assisting torque being provided in the region 375 near the end of the stroke. The curve 376 shows variations in velocity over the same range of movement varying from zero up to a relatively constant value and then down to zero near the end of the movement.

The system of the present invention is capable of operation in several different modes. In one mode, the system sets a preprogrammed variation in motor torque over a range of arcuate movement of the driveshaft, by setting a preprogrammed range of motor current variations. The system then monitors the velocity of movement of the driveshaft over that range of exercise movement by the user. As the velocity is monitored, the system compares the actual velocity of movement by the user to a preprogrammed variation in velocity over the same range of movement. If the exercise performance of the user does not maintain the preprogrammed velocity then the system provides a display to the user showing where his velocity of movement is faster than and where it is slower than the program selected values.

In a second mode of operation, the system can set the velocity which will be maintained over the arc of movement in a preprogrammed manner and then, as the user is moving through that arc, the system varies the torque of the motor as necessary in order to keep the velocity constant. It displays to the user the torque input into the driveshaft by the motor in order to keep the velocity constant, and hence, shows the user how much assitance or resistance was provided by the motor at each point over the range of movement in order to keep the velocity thereof constant. This mode is illustrated by the plots 370 and 376 of FIG. 8.

In a third mode of operation, the system sets the torque of the motor in accordance with a preprogrammed variation in reference torque values over a range of movement and wants to maintain a preprogrammed variation in velocity values over that range of movement. When the velocity of exercise movement against the torque varies from the preprogrammed value by greater than a preprogrammed difference, then the system varies the torque values by a preprogrammed factor. That is at times when, due to fatigue for example, the user is unable to maintain movement velocity selected at the programmed resistance torque values he had been using, the system can decrease the torque against which the user is working by a preselected factor. This change in resisting torque may be selected either automatically by the system due to the decrease in performance by the user or in accordance with a signal from the user by means of the thumb switch.

In one exemplary scenario of exercise routines the first mode of operation could be selected in which the system maintains a constant velocity of exercise movement throughout the entire range of movement and supplies whatever force is necessary in order to keep the velocity of the movement by the user constant. This is a mode which would typically be used to limber up at the beginning of an exercise routine. Following a few reps of this mode, the system could be placed in a second mode of operation wherein the user would push with maximum force against the driveshaft and the system would vary the torque of resistance in a fashion necessary to keep the velocity of movement constant. A display is provided which shows a diagram of this variation in torque by the system similar to FIG. 8 illustrating where it is maximum and where it is minimum in order to maintain a program selected constant velocity. This display in effect produces a strength profile of the user over the range of arcuate movement. At this point, the user might enter a modified second mode of operation wherein the range of maximum exertion torque values which were ascertained in the second mode of operation and, hence stored in the machine, would all be decreased by a constant value hence providing a resistance against movement by the user which is customed profiled to that individual user's particular pattern of strength curve over the range of movement. This is a feature which is attempted by numerous other variable resistance exercise systems but which is totally impossible in the absence of a custom measurement of force of the individual user over the range of movement, as is accomplished in the second mode. The user might typically do a substantial number of reps at this particular pattern. Thereafter, as the strength of the user becomes less with fatigue, the system then enters the third mode at which the torque values of resistance are again decreased by a predetermined factor, either by selection of the user or automatically based upon the decrease in velocity measured by the machine falling below a preselected value. Finally, having completed his strength exercise routine, the user might return to the first mode and again move the muscles through the entire range of movement at constant velocity with the machine supplying whatever force is necessary to maintain that constant velocity.

The system is also capable of making a substantial number of measurements with regard to the strength of the user of the machine. This is particularly useful in both weight training as well therapeutic uses of the machine. For example, in one mode operation the system may be preprogrammed with a constant torque of resistance force and then monitor the velocity which is achieved by the user to tell the user in a display how far off he is from a preprogrammed velocity variation over that range of movement. This information is especially useful to a therapist in that it shows him precisely at what points in the movement there is damage to a particular joint or muscle which is indicated by the points at which the velocity of movement through that range is lowest.

Certain other measurements are readily ascertainable by the system of the present invention. For example, the system can measure the velocity of performance by a user over a preprogrammed range of torque values over a range of movement. Similarly, the system can measure the performance of a user over a preprogrammed velocity range of values.

In addition, the system can measure a user's range of movement over an arc and provide data to a therapist with regard to what ranges of movement have been inhibited by an injury to the body. Similarly, the system can even force a movement through an increased range of movement by applying force from the machine itself in order to increase the flexibility of a joint which is in therapy to enhance a limited range of movement due to an injury.

An additional manner in which the system of the present invention may be used is to produce a custom strength curve over a preprogrammed range of velocity values. One may derive from that set of torque values an indication as to in what areas one is particularly weak and then custom configure a range of torque value variations, by means of programming, to strengthen the muscle groups in that particular area. Similarly, one may also custom configure a velocity range and evaluate in what areas a user is particularly slow and custom configure a torque range by programming to increase the speed of movement at that same points at which dificiencies appear.

The multi-axis embodiment of the system of the present invention incorporates individual encoder and motor assemblies associated with each one of a plurality of distinct axes of movement of limbs of the body. These systems provide the same type of measurement data and resistive control variations described above in connection with the modes of operation of the single axis embodiment to enable an ascertainment of anatomical/- physiological data from a patient and a programmed therapy of movement heretofore unavailable in any prior art systems. Generally, prior art machines are single axis and require elaborate techniques of isolation of each axis of movement in order to evaluate and provide therapy. This is a very unnatural technique in that these parts of the body do not ever move in a single axis. Movement in one direction effects the movement in other directions so that unless input is simultaneously obtained from the multi-axis movement of certain joints a distorted picture of performance and a distorted application of therapy occurs. The multi-axis system of the present invention enables a joint to be moved and preprogrammed resistance to be incorporated into therapy in a manner which is previously been completely unavailable.

System Software Overview

Figures 9A, 9B:
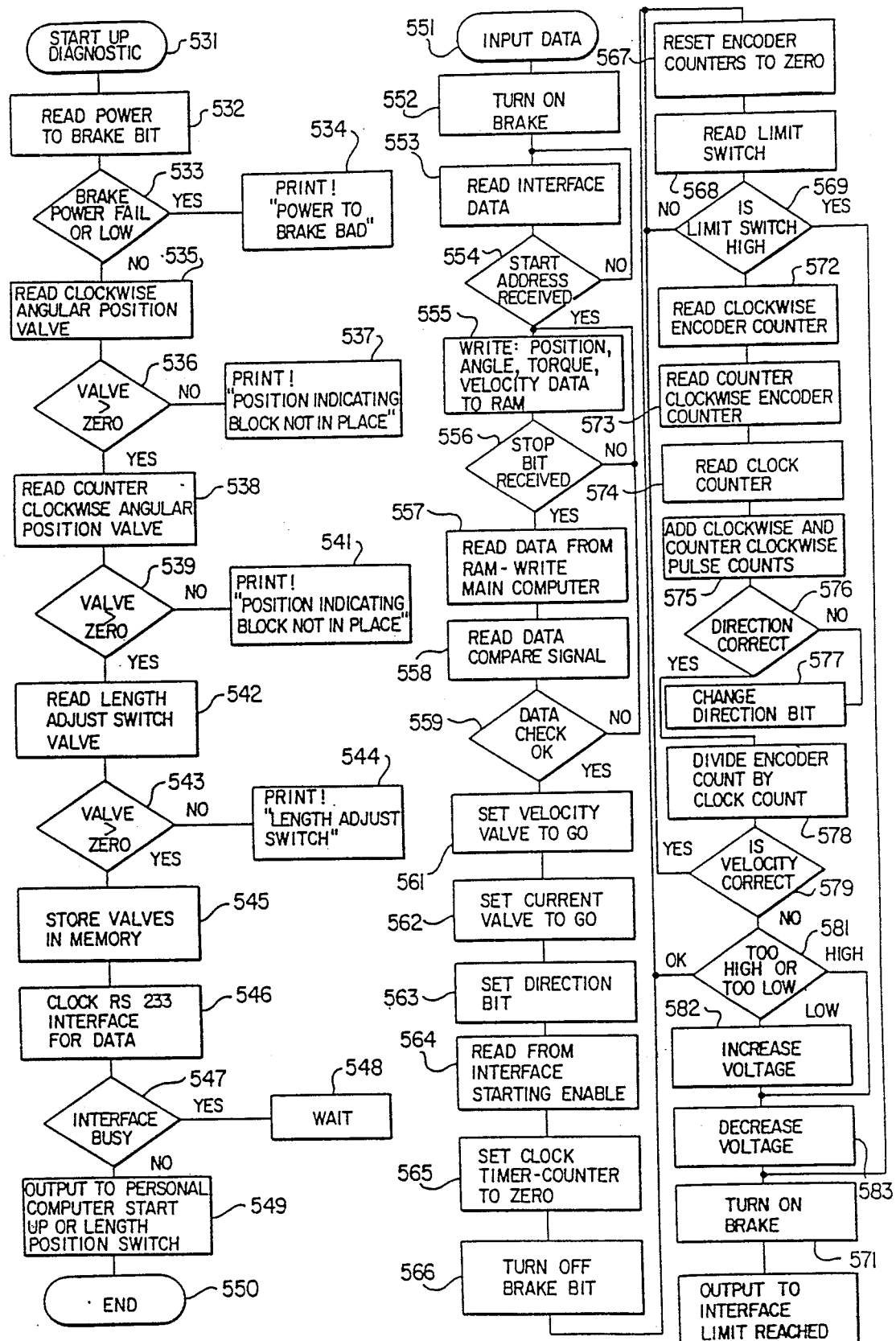

The system of the present invention is operated by stored software part of which is shown in the flowcharts of FIGS. 9A-9F. When the system is initially energized start-up programs stored in the EPROM of the microcomputer and illustrated in FIGS. 9A and 9B, are used to check the status of the peripherials such as the brake power supply, the position indicating switches and if it is a multi-axis system, the exercise arm length adjusting switches. If there is a safety failure in any of the status checks a message is sent by the microcomputer to the main personal computer saying there is a problem.

Once the safety checks are complete the system load a preselected exercise program from the memory of the personal computer into the RAM memory of the process control microcomputer. To begin execution of the program the angular position encoder 81 must have a zero reference point so the driveshaft 102 and arm 46 is first rotated all the way in one direction until one of the position indicating blocks 131 or 132 cause the closure of one of the position limit switches 128 or 129. The angular position encoder is now at a zero reference point for the beginning of the exercise program and the electromechanical brake is actuated to hold the driveshaft in that position. A message is sent to the personal computer that the system is ready to begin the exercise routine and a display to that effect is shown to the user. Depression of the thumbswitch by the user signals the computer to begin execution of the selected exercise program.

When the exercise arm reaches each extreme of its movement along its arcuate path, closure of the position limit switch causes the brake to be applied and no further movement occurs until a signal is received from the user's thumbswitch. This is both a safety feature and it enables a muscle group to be held in a stretched position if desired.

A run program for the system is stored in the EPROM of the microprocessor and illustrated in FIG. 9C. This program reads the velocity and torque required for each angular position of the driveshaft from the selected exercise program stored in the RAM memory of the microprocessor. As the motor and driveshaft begin rotating, the microcomputer regularly samples the angular position encoder and calculates the angular position and angular velocity. The computer recognizes each successive angular movement of the driveshaft by ½ of 1 degree and inputs a new value of measured position to the RAM to obtain a new value of velocity and torque therefrom if required by the exercise program for the new position. If the exercise program is one which includes a preselected velocity then the processor adjusts the motor current virtually constantly to vary the torque so that the user maintains the preselected velocity of movement and sends the torque values to the personal computer for display and storage every ½ degree of angular movement. If the exercise program is one which includes preselected torque values (which may or may not be constant) the motor current is varied to maintain those torques and the variations in angular velocity by the user over the range of movement are sent to the personal computer for display and storage every ½ degree of movement. The microcomputer checks on each iteration loop as to whether or not a position limit switch has closed yet and continues with the execution of the exercise program until that occurs, upon which event it actuates the brake and exits the program.

Figure 9E:
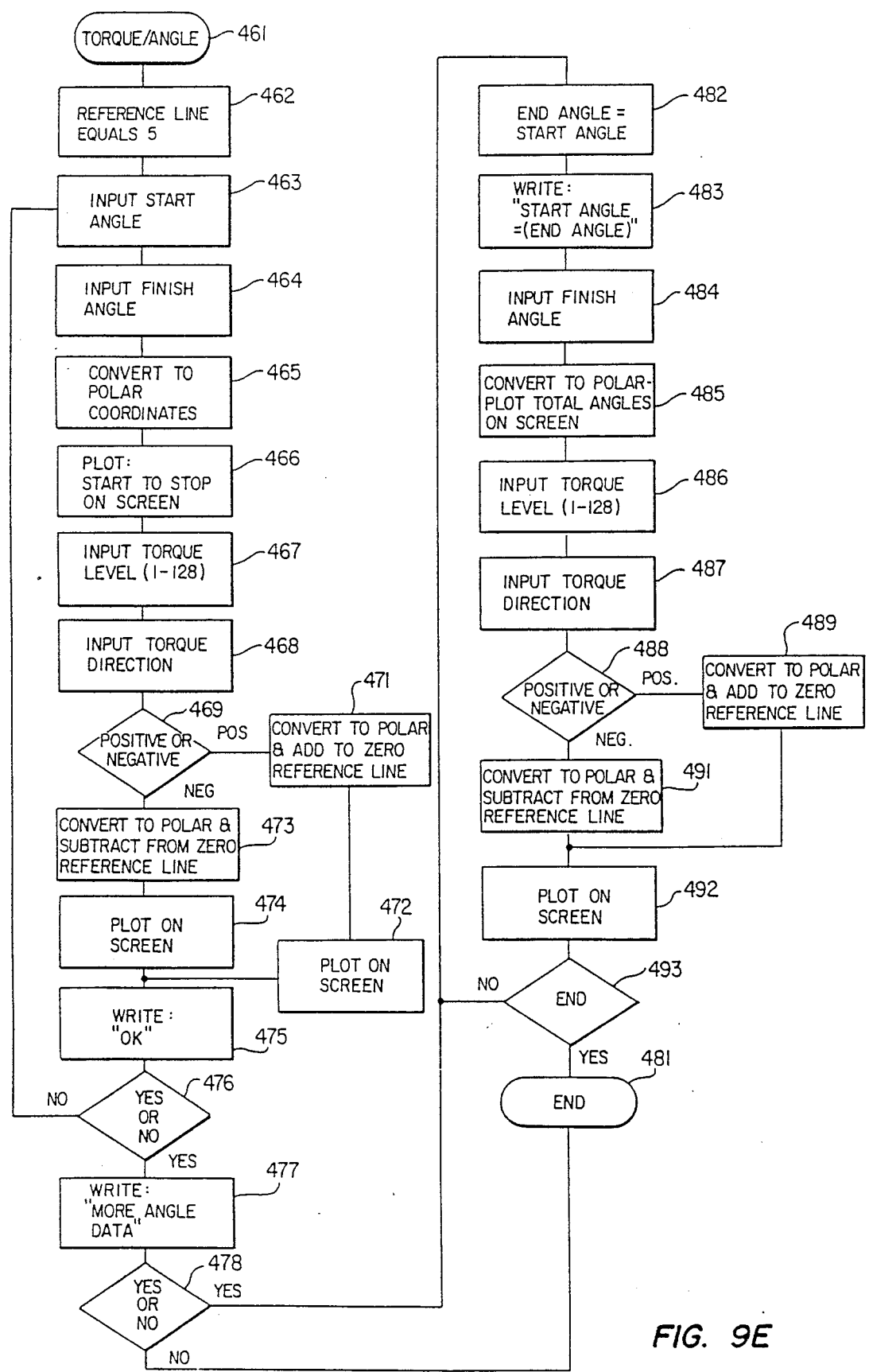

A safety routine is illustrated in FIG. 9E. The program constantly monitors the angular velocity of the driveshaft and if the velocity exceeds a selected value or is in the incorrect direction, it interrupts the exercise program being executed, turns off the motor current and applies the brake. A display advises the user to push in the opposite direction. If the detected anomaly in velocity was due to the user pushing in the wrong direction the system returns to the exercise program. If not, the system remains shut down and a display advises the user to discontinue use.

Figure 9F:
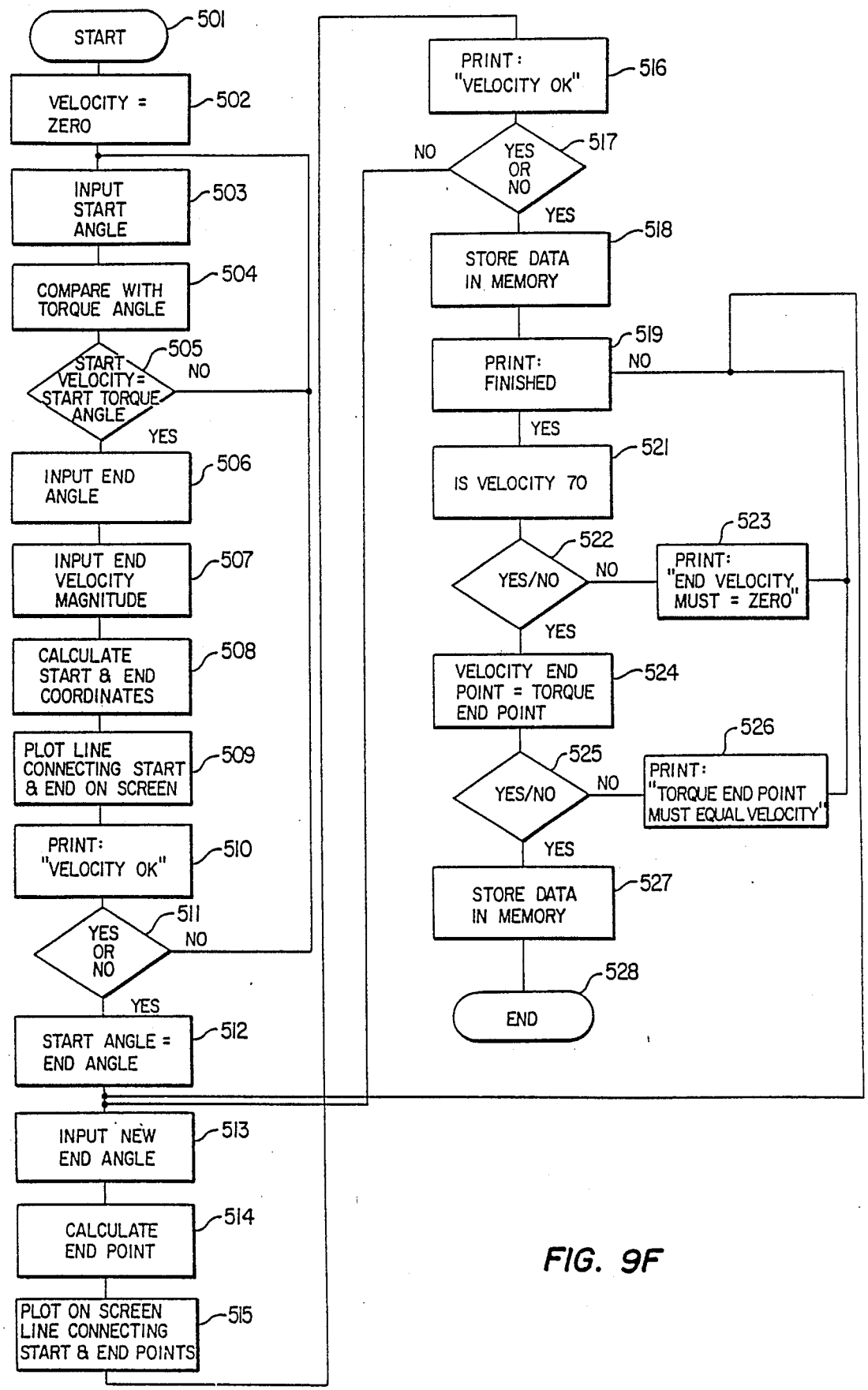

Two related programs, illustrated in FIGS. 9E and 9F, are routines which may be employed by a user to custom configure exercise programs. The program of FIG. 9E is used to input a half repetition sequence of torque values which vary over a range of angular positions while observing a display of the torque values being input to insure their corrections. Similarly, the program of FIG. 9F is used to input a half-repetition sequence of velocity values which vary over a range of angular positions while observing a display of the velocity values being input to insure their corrections. Both programs enable customization of exercise programs in easy to understand English language commands and are especially useful to exercise therapists who are not skilled programmers.

Figure 9G:
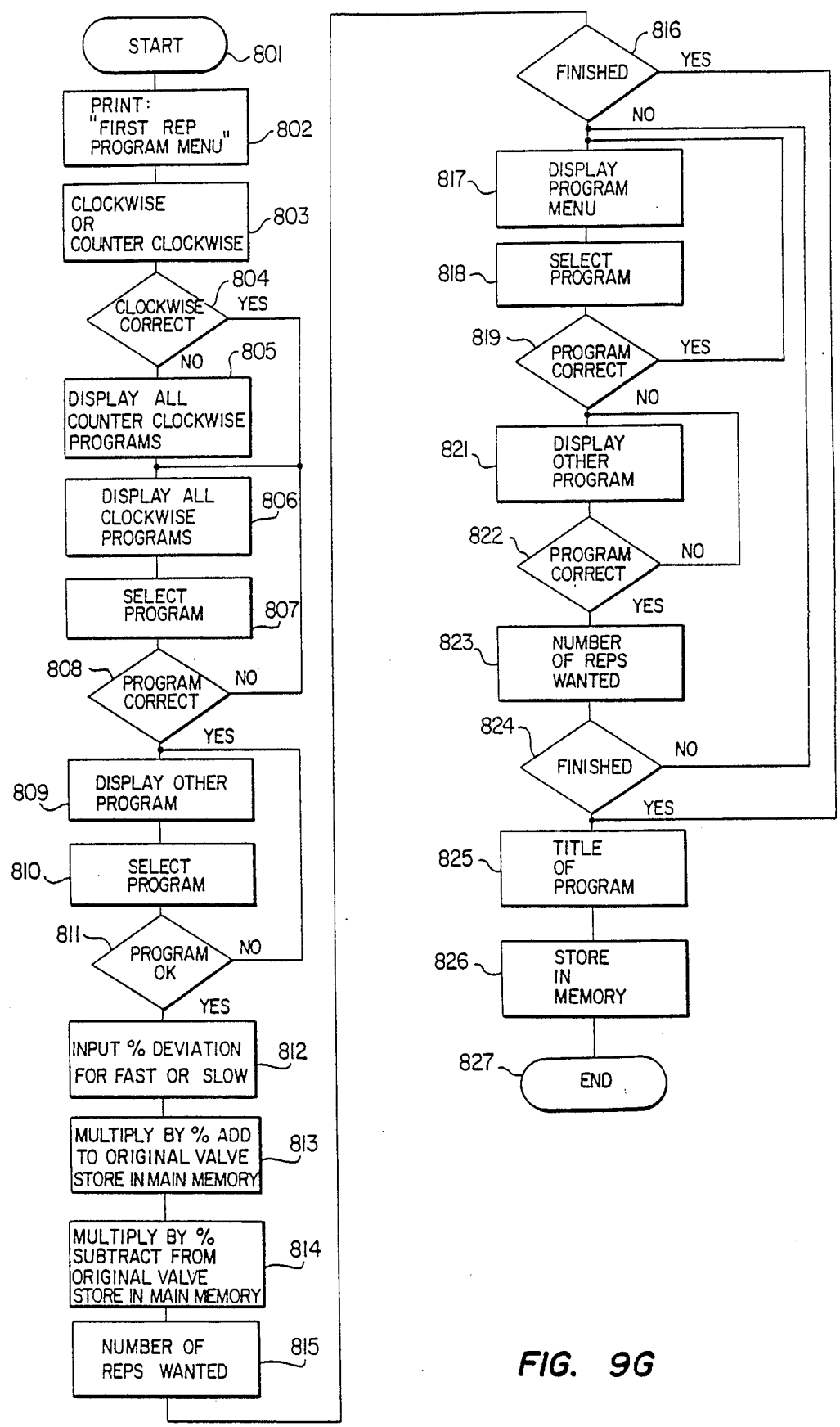

The program shown in FIG. 9G is another tool which can be used by the therapist to assemble custom exercise repetition routines from the custom configured half repetitions assembled by the programmers of FIGS. 9E and 9F. In the FIG. 9E program, a sequence of torque values is assembled for a ½ rep in either the clockwise or counterclockwise direction. With the FIG. 9F program, a sequence of velocity values is assembled for ½ rep in either the clockwise or counterclockwise direction. With the FIG. 9G program selected ones of the sequences of ½ reps are assembled into multiple full reps of either torque or velocity values as desired.

Figure 9H:
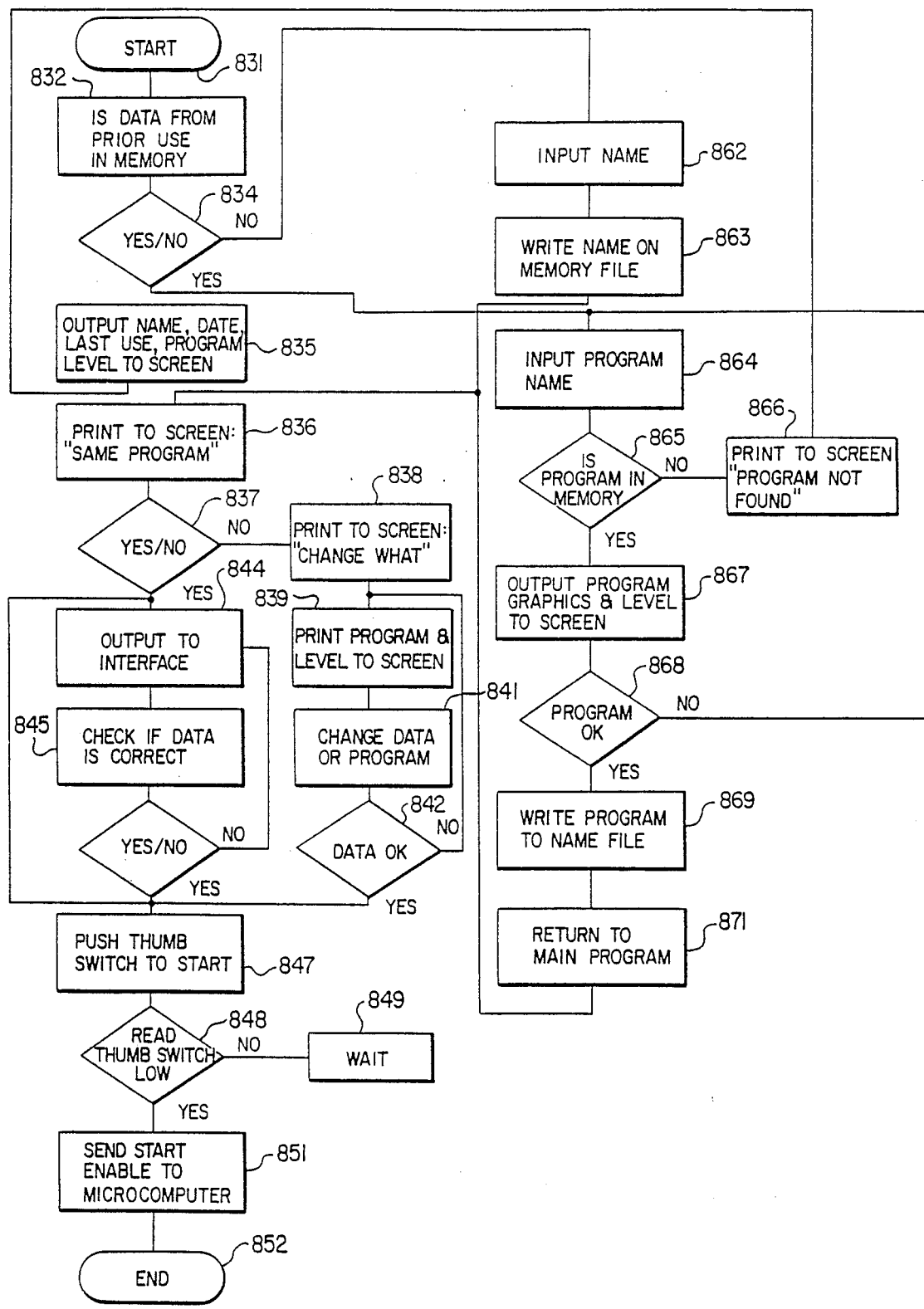

The program of FIG. 9H is one which is employed by a user to call from memory a menu of available stored exercise programs for selection. Once a stored program is selected from the menu the system displays a moving figure demonstrating the stored program routine. If the routine demonstrated to the user is not acceptable he can return to the menu for selection of another program routine.

System Program Flowcharts

FIG. 9A shows a flowchart for a start-up/diagnostic routine. This program of FIG. 9A written in machine language, and stored in the read only memory of the process control microcomputer and checks for brake power. If brake power is determined to be OK, it then checks for value of the position indicator switches. If these switches are not closed, the position indicating blocks are not in place. This information is output to the main computer, and displayed to the user. The program then checks the length adjust switch, if the machine is a multi-axis machine, to see if this value is greater than zero, indicating that the length adjust stop is properly in place. If the value is zero, it sends a message to the main computer stating that the length adjust switch is questionable. It next sends the values of the position indicating switches and the length adjust switch (length adjust switch if multi-axis machine) to the main computer.

Referring now to the start-up program shown in FIG. 9A, start-up diagnostic routine 531 begins by reading the power to the brake bit of the system at 532 and evaluating at 533 whether or not brake power has either failed or is low. If so, then the system prints at 534 "Power To Brake Bad" on the screen to the user and stops. If the brake power is OK at 533 then at 535 the system reads the clockwise angular position indicator switch value and determines at 536 whether the value is greater than zero. If the value is not greater than zero then the program prints at 537 the comment "Position Indicating Block Not In Place" to advise the user that he has not selected the angular position ranges by insertion of the blocks into the angular position plate. If, however, the value of the angular position indicator switch value determined at 536 is greater than zero then the counterclockwise angular position value is read at 538 and evaluated at 539 as to whether or not it is greater than zero. If is not, then the system prints "Position Indicating Block Is Not In Place⇌ at 541 to indicate to the user that the counterclockwise angular position indicating blocks has not been inserted in place. If, however, the value is greater than zero at 539 then at 542 the length adjust switch value is read and whether or not its value is greater than zero is evaluated at 543. If not, the system prints at 544 "Length Adjust Switch⇌ on the screen to advise the user. If, however, the length adjust switch value was greater than zero as evaluated 543, then each of the values are stored in memory at 545 and the RS 232 interface is checked to see whether or not data is present at 546. If the interface is evaluated as being busy at 547 then the system waits at 548. If the interface is not busy at 547 then at 549 the stored values are output to the personal computer along with an indication that start-up is OK. The program ends at 550.

FIG. 9B describes a continuation of the start-up procedure. If the program in FIG. 9A determines that the system is operational, the program in FIG. 9B then inputs from the main computer program the data needed for one repetition. These data have been obtained from the user and are stored in the computer memory, by methods described below in FIGS. 9E and 9H. The data is then read back to the main computer, and checked for correctness. If the data is OK, the process control computer then proceeds to set a predetermined velocity/torque/direction value. It waits for a command from the main computer, which is signaled by the user through a thumb switch. When this command is received, the timer counter is set to zero, the brake is turned off, the encoder counters are set to zero, and the limit switch on the rotating arm is checked for closure. If the limit switch is not closed, the computer then inputs the pulse encoder counter values and the clock counter value to the computers random access memory. It then determines if the angular motion direction is correct. If correct, it then determines the angular velocity, and checks it for accuracy. If the velocity is correct, the program then loops back to reset the encoder counters, and continues in the manner described above. If the velocity is incorrect, a determination is made whether the velocity is too high, or too low, and the voltage applied to the motor is increased or decreased accordingly. The program then loops back to check if the limit switch is closed, and continues in the manner described above. The program will continue in this manner until the limit switch is closed. When the limit switch closure has been determined, the electromechanical brake is turned on and the main computer is informed that the position limit switch has been reached.

Referring to the details of the second start-up program shown in FIG. 9B, data input at 551 begins by turning on the motor shaft brake at 552 and reading interface data at 553. If a start address has not been received as evaluated at 554 then the system returns to again read interface data at 553. If the start address has been received at 554 then the system continues on to write position, angle, torque, and velocity data into the RAM memory of the process control computer at 555. The system evaluates whether or not a stop bit has been received at 556 and if not returns to rewrite the data into the RAM at 555. If a stop bit was received at 556 then the system continues on at 557 to read data from the RAM and write into the main computer. At 558 the system reads a data compare signal and checks at 559 whether or not the data is OK. If the data is not acceptable, then it returns to 555 to again write the position, angle, torque, and velocity data into the RAM memory. If, however, the data is found to be OK at 559 then velocity values are set to go at 561. Next, current values are set to go at 562, the direction bit is set at 563 and starting enable is read from the interface at 564. Next, the clock timer is set to zero at 565 and the brake is turned off at 566.

The encoder counters are reset to zero at 567 and the limit switches read at 568. If the limit switch is found to be high at 569 then the brake is turned on at 571 and the system is disabled. If, however, the limit switch is not high then the clockwise encoder counter is read at 572 and the counterclockwise encoder counter is read at 573. The clock counter is read at 574 and the clockwise and counterclockwise pulse counts subtracted at 575. The difference of the clockwise and counterclockwise pulse counts are evaluated at 576 to determine whether or not the direction of rotation is correct or not. If not, the direction bit is changed at 577 to rotate the motor in the opposite direction. If the direction is found to be correct at 576 then the system continues to divide the encoder count by the clock count at 578 to determine whether or not the velocity is correct at 579. If the velocity is not correct then the system continues to 581. If, however, the velocity is found to be correct then the system loops back to 567 to reset the encoder counters to zero. At 581 the system check to see whether or not the velocity is too high or too low. If the velocity is found to be too low then the voltage on the motor is increased at 582. If the velocity is found to be too high then the voltage is decreased at 583. If the velocity is found to be OK then the system returns to reset the encoder counter to zero at 576 and the exercise cycle is repeated. When the limit switch is reached at 569 as the exercise cycle stroke completes itself, the brake is turned on at 571 and an output is provided to the RS 232 interface to the personal computer at 584 that the angular limit has been reached.

Flowchart 9C describes a program for the microcontroller computer to control the motor torque during ½ of a repetition. It is preferably written in machine language, for speed, and stored in the PROM memory chip connected to the microcomputer. The program reads the values stored in the microcomputer random access memory received from the main computer storage. The program writes these values to the motor driver board and then reads values from the encoder and determines the direction and amount of shaft rotation. If the shaft rotation is incorrect, it applies the brake and exits to a subroutine which determines whether the fault lies with incorrect user performance, or a control failure. If it is determined that a control failure has occurred, the program sends an interrupt message to the main computer, notifying the user that a control failure has occurred. If, however, the direction is correct, the program determines the velocity of shaft rotation. It then compares the velocity achieved to the velocity desired within a tolerance read from random access memory, input from the main computer program. If the velocity is determined to be slow, the motor torque is decreased, and the program loops back to determine velocity again. The velocity is again compared and checked to see whether it is fast, slow, or OK. If the velocity is determined to be fast or slow, the program loops back again, until the velocity is determined to be OK. The program then stores the angular position count and torque setting to memory. It then continues reading another position count and then checks to see if the limit switch has been reached. If so, the program turns on the electromechanical brake, and writes the position torque data to the main computer. It then checks to see if the data is correct, and ends that ½ repetition. If the limit switch is not reached, the program checks to see if the shaft is rotated greater than ½ degree. If it has not, the program loops back to read the encoder counter again, and continues. If the rotation is determined to be greater than ½ degree, the velocity/angle is incremented by 1, and the program loops back to read from the microcomputer random access memory a new velocity position angle, and continues on. By deleting the increase or decrease in the torque adjustment blocks, this same program would then operate such that the torque would be set only by the computer program. This would correspond to the mode in which torque is controlled and velocity is measured.

Referring next to the flowchart of FIG. 9C, there is shown a flow diagram of the manner in which the single axis system of the present invention controls the motor torque of the driveshaft controlling the exercise arm. The routine begins at 401 by reading the desired direction wanted from the memory at 402 and thereafter reading the start angle and the tolerance from velocity permissible at 403. Next the system reads the velocity and the position wanted table at 404, reads the encoder clockwise counter at 405 and then the encoder counterclockwise counter at 406. The clockwise and counterclockwise counts are subtracted at 407 and at 408 a decision made to whether or not the direction of rotation is correct. As discussed above, if the difference in the clockwise and counterclockwise counts is positive the rotation is in one direction and if the difference is negative rotation is in the other. If the direction is incorrect at decision block 408 then brakes are applied at 409 and the program exited to the safety program shown in FIG. 9D. If, however, the direction is OK at 408 the program continues on.

Next, the system reads the timer pulse counter at 410 and then divides the position encoder count value by the clock pulse counter value at 411. The measured velocity is given by the quotient of the position encoder count divided by the clock pulse counter count. This value of measured velocity is compared to the velocity tolerance read at 403 by comparing at 412. If the comparison at 413 determines that the velocity is slow then the motor torque is increased at 414 and the system returns to read the timer pulse counter again at 410. If, however, the velocity is determined at 413 to be fast then the motor torque is increased at 415 and returned to read the timer pulse again at 410 and check to see if the velocity is within tolerance. If instead the velocity at 413 is determined to be OK, then the position count and torque are stored in memory at 416.

The clockwise encoder counter is read at 421 and then the limit switch is read at 422. If the limit switch output signal is high, indicating that the exercise arm has reached one of its limits then the brake is applied at 424. If, however, the limit switch has not been closed at 423 then the system compares the pulse count in the clockwise encoder counter at 425 and queries at 426 whether or not the shaft has rotated ½ of a degree. If not, the system returns to 405 to read the encoder on the clockwise counter. If, however, the shaft has rotated ½ of a degree at 426 then 1 increment is added to the velocity position at 427 and a further position update is read to the main computer at 428. If the limit is found to be high at 423 the brakes are applied at 424 and the position and torque data are written out to the personal computer at 431. The data is read back again into the system at 432 and at 433 a comparison made to determine whether or not the data is OK. If not, the system cycles back to 431 and the data is again written into the personal computer. If the data is acceptable then the cycle ends at 434.

FIG. 9D shows the short safety subroutine 451 wherein the torque value is lowered to zero at 452 and the direction of rotation of the shaft is evaluated at 453. If the direction is correct then the system prints out onto the video display of the personal computer the message "Push In The Other Direction⇌ at 454 to indicate to the user that torque is being exerted in the wrong direction. If, however, at 453 the direction is not OK then a control signal is sent to the personal computer display to print on the screen the message: "Control Bad - Do Not Use Machine" to indicate to the user that some malfunction in the machine has occurred and that he should discontinue use thereof.

The flowchart of FIG. 9E describes a program which allows a user skilled in physical therapy, but not skilled in computer programming, to develop an exercise program for ½ of one repetition, either clockwise or counterclockwise. The program asks the user for the angular positions at which it is desired to start and end joint rotation. The computer then plots on the screen a graphical circular representation of the start and stop angles. The program next asks the user for a starting torque. It takes this information and converts the written data into graphical data, containing both angle and magnitude of the selected torque. The computer then queries the user if the inputted data displayed in graphical form is satisfactory. If the answer to this query is no, the program loops back to inputting the start angle, and the process is repeated. If the answer is yes, the computer asks the user if more angular data is desired. If no, the program ends. If yes, the computer then changes starting angle to the value of the previous ending angle, and asks for a new ending angle. It then plots this on the screen similar to the manner described above, and continues. It then asks the user if he is finished. If yes, the program ends. If no, program loops back to where the ending angle equals the new starting angle, and continues. This program thus allows easy input of torque/angle data to be input to the computer by an individual not skilled in programming. It also allows user to graphically determine the torque/angle profile throughout the range in which the joint is rotated.

Referring now to FIG. 9E, the torque/angle program at 461 begins by setting a reference line at 462 and at 463 an start angle is input. Next, a finish angle is input at 464 and both are converted to polar coordinates at 465. Next, the personal computer output monitor is used to write on the screen and plot on the screen in polar coordinates the start angle and stop angle of the segments of the exercise program at 466. At 467 a torque level is input in 1 of 128 different levels to the system and torque direction is input at 468. Torque direction is evaluated at 469 and if found to be positive, the values are converted to polar coordinates and added to the zero reference line at 471 and then plotted on the screen at 472. If, however, the torque value is found to be negative at 469 then that value is converted to polar coordinates at 473 and subtracted from the zero reference line and plotted on the screen at 474. Next, the system writes on the screen the query of the user "OK" at 475 and the user is permitted to respond at 476 by means of the keyboard.

If the answer is no, then the system returns to input a new start angle at 463 and the process repeated. If, however, the answer is yes at 476 then the further query is made of the user by printing on the screen the query "More Angle Data?" at 477 and again the user is permitted to respond at 478 by the keyboard as either yes or no. If no, the routine is ended at 481. If, however, the answer is yes, the system sets the end angle equal to the start angle at 482 and then writes on the screen at 483 the statement "Start Angle Equal". Next, at 484 the finish angle is input to the system, converted to polar coordinates and plotted with the total angles on the screen at 485. Next, a torque level in 1 of 128 values is input at 486 and a torque direction input at 487. The system then evaluates at 488 whether or not the torque is positive and if so, the torque value is converted to polar coordinates and added to the zero reference line at 489. If, however, the torque value is negative, then the value is converted to polar coordinates and subtracted from the zero reference line at 491 and one or the other of the polar coordinate values in then plotted on the screen at 492. Finally, the query of whether or not program is to be ended at 493 is asked and if not the system returns to 482. If the end has come then it occurs at 481.

FIG. 9F is very similar to FIG. 9E, except that in this case, velocity/angle position data is input. The program checks the velocity/angle against the torque/angle already determined in the machine via flowchart 9E insuring that the start and stop velocity angles equal the start stop torque/angle already in the computer. The program also checks that the start velocity and ending velocity equal zero.

In the flow chart of FIG. 9F, the program begins at 501 and the first velocity is set to zero at 502. Next, start angle is input at 503 and compared with torque angle at 504. If the start velocity is not equal to the start torque angle at 505 then the system returns to request an input of a different start angle at 503. If the start velocity, however, is equal to the start torque angle at 505 then an end angle is input at 506. An end velocity magnitude is input at 507 and the system calculates the start and end coordinates at 508. Next, the system plots the line connecting start and end coordinates on the screen at 509 and then prints on the screen "Velocity Ok?" as a query to the user at 510. At 511, the user is permitted to respond by keyboard and if velocity is not OK then the system returns to input a new start angle at 503. If, however, velocity is OK and indicated to be so by the user at 511 by means of the keyboard, the start angle is set equal to the end angle at 512 and a new end angle is input at 513. Next, the system calculates an end point at 514 and plots on the screen a line connecting the start and end points at 515. Again, the system prints onto the screen "Velocity OK?" as a query to the user at 516 and the user responds at 517 by means of a yes or no input from the keyboard. If the velocity is not OK, then the system returns to input a new end angle at 513. If the velocity is OK, then the data is stored in memory at 518 and the system prints the query of the user at 519 "Finished?". If not, then the system returns to input a new end angle at 513. If, however, the user does indicate finished at 519 the system evaluates whether or not the velocity is greater than zero at 521 and at the decision box 522 the evaluation is made. If the velocity is not greater then zero then the system prints on the screen "End Velocity Must Equal Zero" at 523 and returns to input a new end angle at 513. If the velocity was greater than zero at 522 then the system evaluates whether or not the velocity end point is equal to the torque end point at 524 and evaluates that question at 525. If the velocity end point was not equal to the torque end point then the system prints on the screen "Torque End Point Must Equal Velocity End Point" at 526 and returns to input a new end angle at 513. If, however, the velocity end point was equal to the end end point as evaluated at 525 then the data is stored in memory at 527 and the routine ends at 528.

FIG. 9G is a flowchart which allows a therapist or user skilled in physical therapy, but not in programming, to take a single repetition program derived by methods described by flowcharts 9E and 9F, and link them together into a complete exercise routine. The computer asks if clockwise or counterclockwise programs are desired. The response to this query commands the computer to display all selected programs in memory. The user would then select the appropriate program from the menu displayed on the screen screen. The user would be queried as to the correctness of the choice. If correct, the computer will display either clockwise or counterclockwise programs, depending upon the above choice. For example, if counterclockwise programs were first selected, the user would select a program from this menu, and then after selection, be presented with a menu displaying clockwise programs. The program then queries the user for the deviation percent the operator will be allowed to differ from desired values. The program then multiplies the stored values by this percentage, and in one instance, adds this percentage to the original values, and also subtracts this percentage from the original values. Thus, three separate values are obtained, consisting of the original value, the value increased by the above stated percentage, and the value decreased by the above stated percentage. These three values are then stored in the computer memory. The user is then queried as to the number of repetitions wanted. The user is then queried as to whether he is finished. If the reply is yes, the user is queried as to the title of this program which consists of a set of individually linked programs, and stored in memory. If the answer is no, program then displays a submenu and continues in the manner described above, linking a subprograms together until the user has completed as entire exercise routine.

Referring now to FIG. 9G, the program starts at 801 and the system first prints out on the screen the first rep program menu at 802 and then asks of the user whether or not clockwise or counterclockwise programs are desired at 803. At 804 the user responds and if counterclockwise programming is desired at 805 all counterclockwise programs are displayed for selection by the user. If, however, a clockwise program was selected at 804, a display of all clockwise programs occurs at 806. The user selects the desired program at 807 and at 808 is asked whether or not it is correct. If not, the systems returns to reselect the desired program. If it was correct, the other programs are displayed at 809 and further program selection occurs at 810. At 811, it is evaluated whether or not the program is correct and, if not, another program is displayed by returning via the loop to 809. If the program is correct, then the system inputs the percentage of deviation for fast or slow movement at 812 and then multiplies by the deviation presented at 813, adds it to the original value and stores it in the main memory. Thereafter, at 814 the value is multiplied by the percentage, subtracted from the original value and stored in the main memory. At 815, the user is queried as to the number of reps wanted. At 816, it ascertained whether or not the user is finished and if not, again the program menu is displayed at 817. A program is selected at 818 and it ascertained whether or not the program is correct at 819. If not, other programs are displayed at 821 and the user again queried at 822 whether or not the programs are correct. If not, programs are continued to be displayed until the correct one is selected. Once the program is selected as being correct then the number of reps wanted of the program are ascertained at 823 and the user is queried as to whether or not he is finished at 824. If a finish has occurred at any of the intermediate points such as 816 or 824, the title of the program is ascertained at 825, stored in memory at 826 and the program finished at 827.

FIG. 9H is intended for the user of a machine to select programs, such as those obtained from the procedure outlined in FIG. 9G, from the main computer memory. The computer queries the user as to whether he has used the machine previously. If answer is no, the computer exits to a subroutine which asks for the user's name and writes it to memory. The computer then displays a menu of stored programs. If the answer is yes, the computer asks for the user's name. It then searches for the last program used by that person, and notes current date. It then queries the user if he wishes to use the same program. If the answer is yes, the position/angle/velocity data contained in that program is outputted to the process control microcomputer. In the case of a multi-axis machine, the information in the program for each individual axis is sent to the appropriate process control microcomputer, and stored in the random access memory of the process control microcomputer. If the answer is no, the program exits to a subroutine which asks which program the user desires, and displays a menu of all exercise routine programs available in the main computer memory. The user will select a program from this menu. The computer will then display in stick figure form, the desired performance values contained in the program. The computer will then query the user if this program is the correct choice. If the answer is yes, the program reenters the main routine of that program. If the answer is no, it loops back to the main program menu, and continues until the answer is yes. Upon returning to the main program, the program continues looking for a signal by the user from the thumb switch, indicating the desire to start the exercise routine.

Referring now to FIG. 9H, a further program is shown with a start at 831 with the user being inquired of at 832 whether or not his data from prior use is in the memory. If not, the system then goes to 833. If yes, then the system outputs the name, date, last use, program and level to the screen for the user to view at 835. Printed to the screen are the words "Same Program?" at 836. The user is queried at 837 and if not, at 838 is asked what "Change What?". Thereafter, the programs are presented along with the level thereof on the screen at 839 and the data or program changed. At 841 it is ascertain whether or not the data is OK at 842. If not, the system returns to 839 to reprint the program and level to the screen and change again. If yes, it returns to the main program flow. If, however, at 834 the same program was selected then at 844 an output is given to the interface of the personal computer and a check is made at 845 to see whether or not the data is correct. If the data is not correct from the user then another output is given via a return to 844. If the data is correct then the user is advised to push the thumb switch to start the program at 847. The system then reads whether or not the thumb switch is low at 848 if not then the system waits at 849. If a thumb switch start signal has been received then an enable is sent to the microprocessor a 851 and the program ends at 852.

From 833 the system goes to the subroutine which begins at 861 and the users name is input at 862. At 863 the system writes the name on the memory file and then inputs the program name at 864. It is asked at 865 whether or not the program is in memory and if not, there is printed to the screen "Program Not Found" at 866. If the program was found in the memory at 865 then the program graphics and level is output to the screen at 867. It is asked at 868 whether or not the program is OK, if not, the system returns to input the program name at 864. If the program is ascertained to be OK at 868 then a program is written to the file at 869. Finally, the system returns to the main program at 871.

As can be seen, the system of operation of the program of the present invention serves to provide regular and systematic means of inputting data to and from the personal computer by means of the RS 232 interface and the evaluating of the data by the process control microcomputer within the system so as to enable the speed, torque, and direction of the movement of the exercise arm attached to the driveshaft of the control motor to be varied in accordance with preprogrammed criteria and in accordance with the performance of the user. Further, the movements and performance both expected and actual of the user can be shown on the display screen of the personal computer for direct interface with the user while the exercise is being performed. In addition, the system provides diagnostic programs for evaluating whether or not the system is operating properly and whether or not the data which has been input to the system is within the ranges and tolerances acceptable to the programming of the system.

Having disclosed and described the detail structure and operation of the single axis embodiment of the present invention, it should be clear that the same principals of operation can be applied to a multi-axis system. In such a multi-axis embodiment, the user is positioned in a fixture structure whereby each major joint of movement of the body is positioned so that as the limbs are moved about the joint by the muscles, a motor brake and encoder assembly are caused to move with the joint and by means of an exercise arm rotating a driveshaft as in the case of the single axis device.

Figure 10:
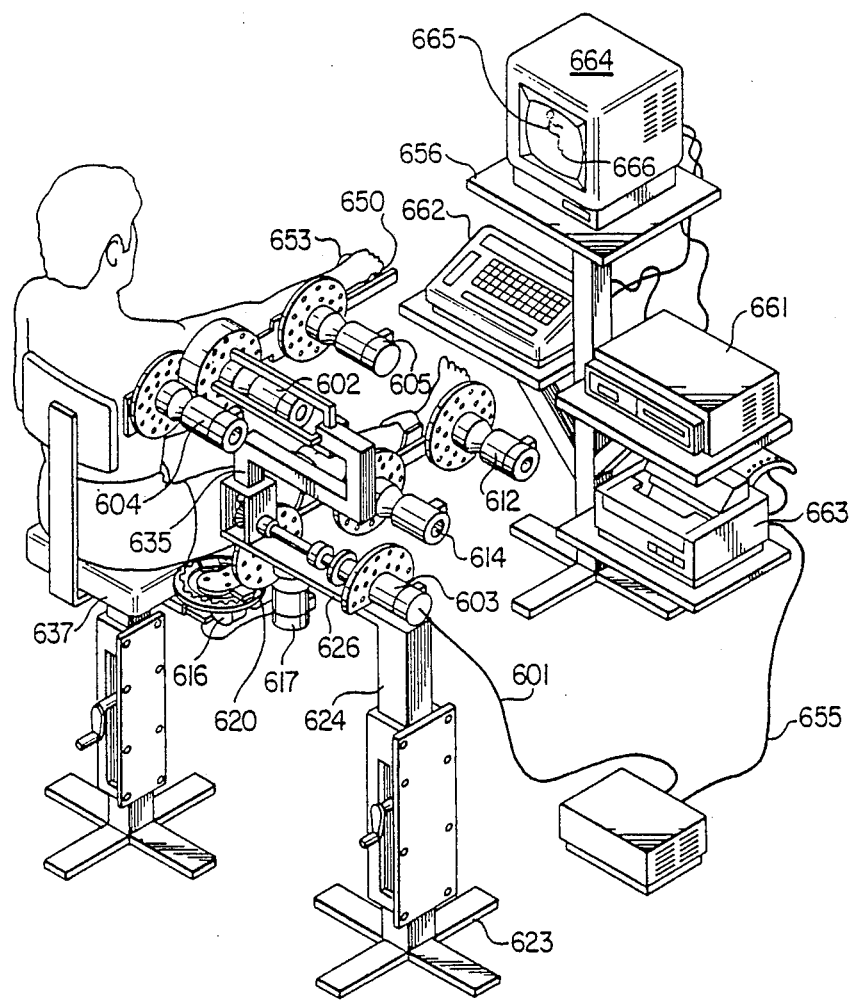
FIG. 10 is a perspective illustration of a multi-axis embodiment of the exercise system constructed in accordance with the teachings of the present invention.

In the multi-axis embodiment shown in FIG. 10, the user is seated his position on a seat 637 adjacent a support stand 624 having a plurality of radially extending legs 623 resting on the floor. The support stand 624 positions a plurality of transversely extending support arms 626 extending outwardly from the stand and some of which having transversely extending support bars 635 mounted thereto. As shown, a plurality of motor/brake/encoder assemblies are located on supporting structure in alignment with various joints about which muscle movement is to be exercised. A series of three motor/brak/encoder assemblies 602, 603, and 604 are located, respectively, in association with the various axes of movement of the right shoulder and specifically, 602 works with vertical movement, 603 works with horizontal movement, and 604 works with axial movement of the right shoulder. A motor/brake/encoder assembly 605 is associated with the right elbow.

In the lower parts of the body the right ankle is associated with the motor assembly 612 while the right knee is associated with motor assembly 614. The right hip thigh joint has one motor assembly 616 associated with its movement in the horizontal plane and another motor assembly 617 associated with its movement in the vertical plane.

Referring to the motor assembly 603, there is an exemplary communication and power cable 601 which connects the different elements of the motor assembly to the process control equipment 651 connected to each motor assembly. It should be understood that each of the plurality of motor assemblies associated with each of the joints is respectively connected to the common control circuitry 651 by a power and control cable (not shown for clarity) and which includes all of the programming and current control circuitry for each of the motor assemblies for each of the axes of movement. The control assembly 651 is connected by means of a communication cable 655 to a personal computer 661 having a printer 663, a keyboard 662 for the input of data and modification of programs therein, and a monitor 664 all positioned on a stand 656 for observation by the user. The monitor 664 has a display 665 upon which various stick figure configurations 666 can be displayed by the computer to indicate to the user the desire performance, the actual performance or past performance of a given series of movements. The display can be used to guide the user through a complex series of exercise involving multiple joints in the training of a user in a particular sequence of movement wherein movement technique, i.e. the rate and manner of each axis of movement is important.

In addition, the user holds in his hand a hand switch 653 which includes a finger switch 650 which must be depressed by the user in order for any of the circuitry to be operable as a safety feature. In addition, the user holds a thumbswitch 653 with which he can communicate with the personal computer and answer inquiries by the machine as to various programming features and functions.

A fundamental concept of the multi-axis embodiments of the present invention is that each of the motor-/encoder assemblies associated with movement of the joints in the hip and leg are physically interconnected with one another to allow natural movement of the legs. That is, the housing of motor assembly 617 is rigidly fixed to the same inertial reference of the user, the seat 637. The housing of motor 616 (which allows movement of the hip joint in a plane normal to that of motor 617) is fixed to the driveshaft of motor 617. The housing of motor 614 (at the knee joint) is mounted to the driveshaft of the motor 617 while the housing of motor 612 (at the ankle joint) is mounted to the driveshaft of motor 614. Thus, each motor assembly is connected to the others in a chain and moves along with the leg joints of the user.

Similarly, the motor/encoder assemblies associated with movement of the joints in the shoulder and arm are physically interconnected with one another to allow natural movement of trunk and arm. The housing of motor 603 is fixed to the inertial reference of the support stand 624 and its driveshaft moves through a right-angle gear assembly 620 to allow mount of the shoulder in the horizontal plane. The housing of motor 602 is connected via angular framework to the driveshaft of motor 603, through the gear assembly 620, to allow movement of the shoulder in a first vertical plane. The housing of motor 604 is connected to the driveshaft of motor 602 to allow movement of the shoulder in a second vertical plane orthogonal to the first. The housing of motor 605 is connected to the driveshaft of motor 604 through a right-angle gear assembly (not shown) to allow movement of the elbow joint in the rotational plane. The driveshaft of motor 605 is connected to an exercise arm at the end of which is gripped by the hand for movement thereof about the elbow flexure plane. Thus, each motor assembly is connected to the others in a chain and moves along with the shoulder and arm joints of the user.

The adjustable length indicating switches, discussed above, send information to the control system as to the adjustable length of each arm of the assembly which is stored for future reference to aid in adjusting the mechanism on successive uses by different users. In both the single and multi-axis embodiments the limits of the user may be strapped to the exercise arms at selected points.

Referring now to FIG. 11, there is shown a block diagram of another multi-axis embodiment of the present invention. There it is shown how a plurality of motor/encoder/brake assemblies are associated with respective ones of different joints which are to be exercised in the system. There it is shown that a motor assembly 701 is associated with the vertical stomach/thigh group while the assemblies 702, 703, and 704 are associated respectively with the vertical, horizontal and axial joint movements of the right shoulder. The right elbow is associated with assembly 705 and the right wrist with assembly 706. Similarly, the movement of the left shoulder is associated with assemblies 707, 708, and 709 and, respectively, with the vertical, horizontal, and axial movements thereof. The left elbow is associated with assembly 710 while the left wrist is associated with 711.

The lower parts of the body including the right ankle is associated with assembly 712, the left ankle with 713, the right knee with 714, and the left knee with 715. The hip thigh joint is associated with assembly 716 while the horizontal stomach/thigh joints associated with 717.

As shown illustratively with assembly 701, each of the components thereof are interconnected with the programming and the current control assemblies individually associated therewith. The encoder 721 is connected by a cable 722 to the controller No. 1 denoted by 723. The electromechanical brake 724 is connected by a cable 725 to the No. 2 controller 723 while the motor 726 is connected over a lead 727 to the No. 3 controller 723. Each of the cables 721, 725, and 727 are grouped into a cable assembly 728. Each of the motor assemblies 702-716 are connected respectively by cable assembly 731-742 to the individual process control computing system and current control circuitry 771-787 associated therewith.

Each of the controllers 723-787 contain the essential elements for current mode control of each of the DC motors in the motor assemblies for each of the axis of movement. An AC-DC convertor 791 and a RS 232 interface and address decoder logic 792 is provided as common equipment in addition to other components which may common to each of the controller Nos. 1-17. As is also shown, the system includes a safety relay 213 and a hand safety switch 650 which serve to interrupt the power supply to all of the circuitry in the event that the user does not have the switch depressed so as to indicate that he ready to proceed with the exercise function.

As can be seen, each of the individual axes of movement may be programmed individually and in a manner which interrelates a movement in one axis with movements in the other axes in a comprehensive series of programmed movements which are especially effective to train a user to follow through a series of movements in a prescribed fashion at a prescribed rate in order to improve the performance of that action.

The multi-axis embodiments function in a similar fashion the single axis embodiment but enable more complex programs and more complex training functions to be executed by the system of the present invention.

As can be seen, the various embodiments of the present invention overcome many of the shortcomings of prior art variable force exercise systems. It is thus believed that the construction and operation of the present invention will be apparent from the foregoing description. While the system shown and described has been characterized as being preferred, it will be obvious that various changes and modifications may be made therein without departing from the spirit and scope of the invention as defined in the following claims.

What is claimed is:

1. A system for providing program controlled force in an exercise apparatus, comprising:
  a driveshaft having an exercise arm extending radially therefrom and adapted for engagement by a user to perform muscular exercise by moving said arm arcuately about said driveshaft;
  a direct current electric motor having a rotor connected to said driveshaft, said motor being operable in the current mode to control the torque thereof by varying the current through the windings of said motor;
  means mounted to said exercise arm for movement therewith for providing a continuous output signal indicative of the arcuate position of said exercise arm; and
  program controlled processor means responsive to said continuous output signal and to the current through the windings of said motor for varying said current to provide a preprogrammed variation in the torque exerted by said motor and, thereby, the force exerted by said exercise arm against the user;
  wherein said processor means includes:
    a process control microcomputer;
    means for monitoring the current flow direction and the value through the windings of said electric motor;
    latch means responsive to said microcomputer for storing a desired value of current flow direction and value through said motor windings;
    a supply of electric power; and
    a current mode control forward converter connected to said power supply and to said current flow monitoring means and responsive to the desired value stored in said latch means for changing the current flow direction and value in said motor winding.

2. A system for providing program controlled force in an exercise apparatus as set forth in claim 1, which also includes:
  means mounted to motor housing for providing first and second angular position limit signals indicative, respectively, of the selected clockwise and counterclockwise limits of permissible arcuate movement of said exercise arm; and
  wherein said processor means is also responsive to said angular position limit signals in preprogrammed variation.

3. A system for providing program controlled force in an exercise apparatus as set forth in claim 2, which also includes:
  means mounted to said exercise arm for providing a limit reached signal to said processor means in a response to said exercise arm reaching the limit of said permissible arcuate movement.

4. A system for providing program controlled force in an exercise apparatus as set forth in claim 3 which also includes:
  electromechanical brake means for preventing rotation of the rotor of said electric motor;
  means responsive to said limit reached signal provided when said exercise arm reaches the limit of said permissible arcuate movement for actuating said brake means to prevent further arcuate movement of said exercise arm; and
  switch means actuated by the user for releasing said brake means to allow further arcuate movement of said exercise arm.

5. A system for providing program controlled force in an exercise apparatus as set forth in claim 1, wherein said continuous output signal providing means includes:
  disc means mounted to the rotor of said electric motor for rotation therewith;

means responsive to rotation of said disc for producing a train of output pulse patterns; and a counter means connected to said output pulse pattern producing means for maintaining a value indicative of the angular position of said exercise arm.

6. A system for providing program controlled force in an exercise apparatus as set forth in claim 1, wherein said current flow direction and value monitoring means include an opto-isolator.

7. A system for providing program controlled force in an exercise apparatus as set forth in claim 1, which also includes:

a safety relay having normally open contacts;

means for directing the current flow path for the windings of the electric motor through the contacts of said safety relay; and switch means responsive to continuous actuation by the user for operating said safety relay to enable the flow of current to the windings of said electric motor.

8. A system for providing program controlled force in an exercise apparatus as set forth in claim 7, which also includes:

electromechanical brake means for preventing rotation of the rotor of said electric motor; and means for actuating said brake means in response to a lack of actuation of said switch means by said user.

9. A system for providing program controlled force in an exercise apparatus, comprising:

a driveshaft having an exercise arm extending radially therefrom and adapted for engagement by a user to perform muscular exercise by moving said arm arcuately about said driveshaft;

a direct current electric motor having a rotor connected to said driveshaft, said motor being operable in the current mode to control the torque thereof by varying the current through the windings of said motor;

means mounted to said exercise arm for movement therewith for providing continuous output signal indicative of the arcuate position of said exercise arm;

program controlled processor means responsive to said continuous output signal and to the current through the windings of said motor for varying said current to provide a preprogrammed variation in the torque exerted by said motor and, thereby, the force exerted by said exercise arm against the user; and means mounted to the motor housing for providing first and second angular position limit signals indicative, respectively, of the selected clockwise and counterclockwise limits of permissible arcuate movement of said exercise arm, wherein said processor means is also responsive to said angular position limit signals in said preprogrammed variation; wherein said means for providing said angular position limit signals comprises:

a circular plate mounted to said motor housing having a central clearance opening through which said driveshaft extends;

an switch array extending circularly around the periphery of said plate, said switch array including a plurality of separate closure means spaced at periodic intervals one from another along the switch array and each of said separate closure means being selectively connected to a respective one of the plurality of signal lines to provide a distinctive output signal in response to the closure of each separate closure means; and means attachable at a selected angular position around the periphery of said circular plate for closing one of the separate closure means of said switch array to provide said distinctive output signal to said processor indicative of said selected angular location of said limits of permissible arcuate movement of said exercise arm.

10. A system for providing program controlled force in an exercise apparatus as set forth in claim 9, wherein:

said circular plate includes an outer ring of circumferentially spaced apertures, each apertures being spaced from the other by an equal arcuate distance;

said switch array includes a flexible insulative housing and each separate closure means is located within said housing and positioned on said plate oriented with respect to one of said apertures; and said closing one of the separate closure means includes a position limit block having a pair of pins extending from one face thereof and spaced apart the same distance as that between a selected pair of adjacent apertures on said plate so that upon insertion therein, said block bears upon and flexes said housing of said switch array to effect actuation of said separate closure means associated with said selected apertures.

11. A system for providing program controlled force in an exercise apparatus as set forth in claim 10, wherein said switch array is a pair of semicircular switches positioned in a mirror image of one another on said plate and said plurality of signal lines are four signal leads for providing a different digital arcuate position indicative said distinctive output signal.

12. An improved variable force exercise system of the type which includes an exercise member adapted for engagement with and movement by a user to effect exercise of the user's muscles and a DC motor in which the torque thereof is controlled by the current through the windings of said DC motor, said DC motor being connected to a driveshaft for rotation therewith, wherein the improvement comprises:

a current mode power supply connected to the windings of the DC motor, said current mode power supply having means for controlling the positive and negative current produced thereby to change the direction and the value of the current flow through the motor windings of said DC motor and vary the torque thereof and thereby change the force of resistance on the exercise member, said current mode power supply including means for electrically isolating the controlled current produced thereby from the AC line voltage source;

means for monitoring the angular position of said driveshaft with respect to a reference position and producing an output signal indicative thereof;

a program controlled processor responsive to said angular position output signals and a stored program for controlling the current produced by said current mode power supply; and opto-isolator means for controlling the peak value of the output voltage produced by said current mode power supply across the windings of said DC motor.

13. An improved variable force exercise system as set forth in claim 12 wherein:

said means for electrically isolating the current mode power supply is a transformer.

14. An improved variable force exercise system as set forth in claim 13 wherein:
said transformer is a forward convertor.

15. An improved variable force exercise system as set forth in claim 13 wherein:
said forward convertor includes means for producing bidirectional current flow through the windings of the DC motor.

16. An improved variable force exercise system as set forth in claim 15 wherein said forward convertor further includes:
transistor means for varying the current flow produced thereby; and
a regenerative drive circuit for switching said transistor means on and off in response to current flow through the windings of said motor.

17. An improved variable force exercise system as set forth in claim 13, which also includes:
means for controlling said output signal to said processor and enabling the program controlled current through windings of said DC motor in response to the position of the exercise member being moved by the user.

18. An improved variable force exercise system as set forth in claim 17, which also includes:
means for producing first and second limit signals to said processor in response to the exercise member reaching each extreme of a selectively permissible range of movement.

19. An improved variable force exercise system as set forth in claim 12 which also includes:
safety relay means having a normally open circuit path connected in the current flow path between said current mode power supply and the windings of said DC motor; and
means responsive to a continuous signal from the user for closing the circuit path of said safety relay means and supplying operating power to said DC motor.

20. An improved variable force exercise system of the type which includes an exercise member adapted for engagement with and movement by a user to effect exercise of the user's muscles and a DC motor in which the torque thereof is controlled by the current through the windings of said DC motor, said DC motor being connected to a driveshaft for rotation therewith, wherein the improvement comprises:
a current mode power supply connected to the windings of the DC motor, said current mode power supply having means for controlling the positive and negative current produced thereby to change the direction and the value of the current flow through the motor windings of said DC motor and vary the torque thereof and thereby change the force of resistance on the exercise member, said current mode power supply including:
a current sense transformer having a primary winding and a secondary winding, said secondary winding of said current sense transformer being connected in series with a diode and a variable burden resistance;
a power transformer having a primary winding connected to a source of DC voltage and in series with a power switch and the primary winding of said current sense transformer;
means for interrupting the current through said power switch; and
means for varying the value of said burden resistance, wherein the current through the power switch is interrupted and the peak output current through the primary winding of said power transformer is controlled;
means for monitoring the angular position of the driveshaft; and
a program controlled processor responsive to said angular position from said monitoring means and a stored program for controlling the current produced by said current mode power supply.

21. The improvement as set forth in claim 20, wherein said burden resistance varying means comprises:
a parallel resistance network including a plurality of series connected resistors and field-effect transistors; and
wherein the resistance value of said network is varied by selectively turn on one of the field-effect transistors.

22. The improvement as set forth in claim 21, wherein the resistance value of each of said series connected resistors is different from the others.

23. A system for providing program controlled force in an exercise apparatus, comprising:
a plurality of driveshafts, each of said driveshafts having an exercise arm extending radially therefrom and adapted for engagement with the body of a user to perform muscular exercise by moving said exercise arm arcuately about said driveshafts, each of said driveshaft being positioned for arcuate movement of the associated exercise arm in a plane parallel to that of the bodily movement about a joint of said user;
a plurality of direct current electric motor, each of said DC motor having a rotor connected to an associated one of said driveshafts, each motor being operable in response to the current mode to control the torque thereof by varying the current through the windings of said DC motor;
means mounted to each of said exercise arms for movement therewith for providing a continuous output signal indicative of the arcuate position of each of said exercise arm;
program controlled processor means responsive to said plurality of continuous output signals and to the current through the windings of each of said DC motors for varying said currents to provide a preprogrammed variation in the torque exerted by each DC motor and, thereby, the force exerted by each of said exercise arms against said bodily movement about said joints of said user.

24. A system for providing program controlled, force in an exercise apparatus as set forth in claim 23, which also includes:
means mounted to the housing of each of said motors for providing first and second angular position limit signals indicative, respectively, of the selected clockwise and counterclockwise limits of permissible arcuate movement of each of said exercise arms; and
wherein said processor means is also responsive to each of said angular position limit signals in said preprogrammed variations in motor currents.

25. A system for providing program controlled force in an exercise apparatus as set forth in claim 24, which also includes:

means mounted to each of said exercise arms for providing a limit reached signal to said processor means in response to each of said exercise arms reaching the limit of its permissible arcuate movement.

26. A system for providing program controlled force in an exercise apparatus as set forth in claim 25, wherein said continuous output signal providing means includes:

disc means mounted to the rotor of each of said electric motors for rotation therewith;

means responsive to rotation of each of said disc means for producing a train of output pulse patterns; and counter means connected to each of said output pulse pattern producing means for maintaining a value indicative of the angular position of each of said exercise arms.

27. A system for providing program controlled force in an exercise apparatus as set forth in claim 19 wherein:

at least two of said DC motors are physically mounted to the driveshaft of the other one of said DC motors in a chain and to allow natural movement of the joints of the user.

* * * * *